US012501224B2

(12) United States Patent
Qi et al.

(10) Patent No.: US 12,501,224 B2
(45) Date of Patent: *Dec. 16, 2025

(54) SYSTEMS AND METHODS FOR SUPPRESSING SOUND LEAKAGE

(71) Applicant: SHENZHEN SHOKZ CO., LTD., Guangdong (CN)

(72) Inventors: Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 235 days.

This patent is subject to a terminal disclaimer.

(21) Appl. No.: 18/188,491

(22) Filed: Mar. 23, 2023

(65) Prior Publication Data

US 2023/0232168 A1 Jul. 20, 2023

Related U.S. Application Data

(63) Continuation-in-part of application No. 17/656,220, filed on Mar. 23, 2022, now Pat. No. 11,622,212, (Continued)

(30) Foreign Application Priority Data

Jan. 6, 2014 (CN) ......................... 201410005804.0

(51) Int. Cl.
*H04R 25/00* (2006.01)
*G10K 9/13* (2006.01)
(Continued)

(52) U.S. Cl.
CPC ............. *H04R 25/505* (2013.01); *G10K 9/13* (2013.01); *G10K 9/22* (2013.01); *G10K 11/175* (2013.01);
(Continued)

(58) Field of Classification Search
None
See application file for complete search history.

(56) References Cited

U.S. PATENT DOCUMENTS 2,327,320 A 8/1943 Shapiro
4,987,597 A 1/1991 Haertl
(Continued)

FOREIGN PATENT DOCUMENTS

CN 201616895 U 10/2010
CN 201690580 U 12/2010
(Continued)

OTHER PUBLICATIONS

Decision to Patent Grant in Korean Application No. 10-2016-7017110 mailed on Jun. 14, 2018, 3 pages.
(Continued)

*Primary Examiner* — Carolyn R Edwards
*Assistant Examiner* — Dylan Maguire Neece
(74) *Attorney, Agent, or Firm* — METIS IP LLC

(57) ABSTRACT

A bone conduction speaker includes a housing, a vibration board and a transducer. The transducer is located in the housing, and the vibration board is configured to contact with skin and pass vibration. At least one sound guiding hole is set on at least one portion of the housing to guide sound wave inside the housing to the outside of the housing. The guided sound wave interfaces with the leaked sound wave, and the interfacing reduces a sound pressure level of at least a portion of the leaked sound wave. A frequency of the at least a portion of the leaked sound wave is lower than 4000 Hz.

20 Claims, 22 Drawing Sheets

Related U.S. Application Data which is a continuation of application No. 17/075,655, filed on Oct. 20, 2020, now Pat. No. 11,304,011, which is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978.

(51) Int. Cl.

| | |
|---|---|
| ***G10K 9/22*** | (2006.01) |
| ***G10K 11/175*** | (2006.01) |
| ***G10K 11/178*** | (2006.01) |
| ***G10K 11/26*** | (2006.01) |
| ***H04R 1/10*** | (2006.01) |
| ***H04R 1/28*** | (2006.01) |
| ***H04R 1/34*** | (2006.01) |
| ***H04R 9/06*** | (2006.01) |
| ***H04R 17/00*** | (2006.01) |

(52) U.S. Cl.

CPC ............ *G10K 11/178* (2013.01); *G10K 11/26* (2013.01); *H04R 1/10* (2013.01); *H04R 1/2811* (2013.01); *H04R 1/2849* (2013.01); *H04R 1/345* (2013.01); *H04R 9/066* (2013.01); *G10K 2210/3216* (2013.01); *H04R 1/2876* (2013.01); *H04R 17/00* (2013.01); *H04R 2460/13* (2013.01)

(56) References Cited

U.S. PATENT DOCUMENTS

| | | | |
|---|---|---|---|
| 5,430,803 | A | 7/1995 | Kimura et al. |
| 5,692,059 | A | 11/1997 | Kruger |
| 5,757,935 | A | 5/1998 | Kang et al. |
| 5,790,684 | A | 8/1998 | Niino et al. |
| 6,478,108 | B1 | 11/2002 | Linhard et al. |
| 6,850,138 | B1 | 2/2005 | Sakai |
| 7,639,825 | B2 | 12/2009 | Fukuda |
| 8,141,678 | B2 | 3/2012 | Ikeyama et al. |
| 8,340,334 | B2 | 12/2012 | Suyama |
| 8,345,915 | B2 | 1/2013 | Shin et al. |
| 9,226,075 | B2 | 12/2015 | Lee |
| 9,729,978 | B2 | 8/2017 | Qi et al. |
| 10,149,071 | B2 | 12/2018 | Qi et al. |
| 10,334,372 | B2 | 6/2019 | Qi et al. |
| 10,506,362 | B1 | 12/2019 | Gomes |
| 10,616,696 | B2 | 4/2020 | Qi et al. |
| 10,631,075 | B1 | 4/2020 | Patil et al. |
| 10,897,677 | B2 | 1/2021 | Walraevens et al. |
| 11,197,106 | B2 | 12/2021 | Qi et al. |
| 11,582,563 | B2 | 2/2023 | Qi et al. |
| 11,622,212 | B2 * | 4/2023 | Qi ........................... G10K 9/13 381/151 |
| 2003/0048913 | A1 | 3/2003 | Lee et al. |
| 2004/0131219 | A1 | 7/2004 | Polk, Jr. |
| 2005/0251952 | A1 | 11/2005 | Johnson |
| 2006/0094481 | A1 | 5/2006 | Gullickson |
| 2006/0098829 | A1 | 5/2006 | Kobayashi |
| 2007/0034493 | A1 | 2/2007 | Kawasaki et al. |
| 2007/0041595 | A1 | 2/2007 | Carazo et al. |
| 2007/0237341 | A1 | 10/2007 | Laroche |
| 2007/0274556 | A1 | 11/2007 | Matsumura et al. |
| 2008/0144874 | A1 | 6/2008 | Wu et al. |
| 2008/0287063 | A1 | 11/2008 | Kidron et al. |
| 2009/0095613 | A1 | 4/2009 | Lin |
| 2009/0127020 | A1 | 5/2009 | Connor |
| 2009/0147981 | A1 | 6/2009 | Blanchard et al. |
| 2009/0208031 | A1 | 8/2009 | Abolfathi |
| 2009/0285417 | A1 | 11/2009 | Shin et al. |
| 2009/0290730 | A1 | 11/2009 | Fukuda et al. |
| 2009/0304209 | A1 | 12/2009 | Nakatani |
| 2010/0054492 | A1 | 3/2010 | Eaton et al. |
| 2010/0080400 | A1 | 4/2010 | Sibbald et al. |
| 2010/0322454 | A1 | 12/2010 | Ambrose et al. |
| 2011/0150262 | A1 | 6/2011 | Nakama et al. |
| 2012/0020501 | A1 | 1/2012 | Lee |
| 2012/0070022 | A1 | 3/2012 | Saiki |
| 2012/0177206 | A1 | 7/2012 | Yamagishi et al. |
| 2012/0201406 | A1 | 8/2012 | Yamaguchi |
| 2013/0188803 | A1 | 7/2013 | Shaanan et al. |
| 2013/0329919 | A1 | 12/2013 | He |
| 2014/0009008 | A1 | 1/2014 | Li et al. |
| 2014/0064533 | A1 | 3/2014 | Kasic, II |
| 2014/0185822 | A1 | 7/2014 | Kunimoto et al. |
| 2014/0185837 | A1 | 7/2014 | Kunimoto et al. |
| 2014/0274229 | A1 | 9/2014 | Fukuda |
| 2014/0294182 | A1 | 10/2014 | Axelsson et al. |
| 2014/0315605 | A1 | 10/2014 | Cho et al. |
| 2014/0355777 | A1 | 12/2014 | Nabata et al. |
| 2015/0030189 | A1 | 1/2015 | Nabata et al. |
| 2015/0256656 | A1 | 9/2015 | Horii |
| 2015/0264473 | A1 | 9/2015 | Fukuda |
| 2015/0268673 | A1 | 9/2015 | Farzbod et al. |
| 2015/0326967 | A1 | 11/2015 | Otani |
| 2016/0037243 | A1 | 2/2016 | Lippert et al. |
| 2016/0037256 | A1 | 2/2016 | Katsuda et al. |
| 2016/0050474 | A1 | 2/2016 | Rye et al. |
| 2016/0150337 | A1 | 5/2016 | Nandy |
| 2016/0165357 | A1 | 6/2016 | Morishita et al. |
| 2016/0295328 | A1 | 10/2016 | Park |
| 2016/0329041 | A1 | 11/2016 | Qi et al. |
| 2017/0201823 | A1 | 7/2017 | Shetye et al. |
| 2017/0223445 | A1 | 8/2017 | Bullen et al. |
| 2018/0167710 | A1 | 6/2018 | Silver et al. |
| 2018/0182370 | A1 | 6/2018 | Hyde et al. |
| 2019/0052954 | A1 | 2/2019 | Rusconi Clerici Beltrami et al. |
| 2019/0238971 | A1 | 8/2019 | Wakeland et al. |
| 2019/0320258 | A1 * | 10/2019 | Ohura .................. H04R 1/2834 |
| 2020/0367008 | A1 | 11/2020 | Walsh et al. |
| 2021/0099027 | A1 | 4/2021 | Larsson et al. |
| 2021/0219059 | A1 | 7/2021 | Qi et al. |
| 2024/0276155 | A1 | 8/2024 | Li et al. |

FOREIGN PATENT DOCUMENTS

| | | | |
|---|---|---|---|
| CN | 102014328 | A | 4/2011 |
| CN | 202435600 | U | 9/2012 |
| CN | 103347235 | A | 10/2013 |
| CN | 102421043 | B | 2/2015 |
| CN | 204206450 | U | 3/2015 |
| CN | 103167390 | B | 4/2017 |
| CN | 109547888 | A | 3/2019 |
| CN | 209330353 | U | 8/2019 |
| EP | 2011367 | B1 | 12/2014 |
| JP | 2006332715 | A | 12/2006 |
| JP | 2007251358 | A | 9/2007 |
| JP | 2013055571 | A | 3/2013 |
| JP | 2014072555 | A | 4/2014 |
| KR | 20050030183 | A | 3/2005 |
| KR | 20090082999 | A | 8/2009 |
| WO | 2004095878 | A2 | 11/2004 |
| WO | 2021133679 | A1 | 7/2021 |

OTHER PUBLICATIONS

International Search Report in PCT/CN2014/094065 mailed on Mar. 17, 2015, 5 pages.

First Office Action in Chinese application No. 201410005804.0 mailed on Dec. 17, 2015, 9 pages.

The Examination Report in European Application No. 14877111.6 mailed on Apr. 23, 2018, 6 pages.

(56) References Cited

OTHER PUBLICATIONS

The Notice of Rejection in Japanese Application No. 2016-545828 mailed on Oct. 10, 2017, 6 pages.
Decision to Grant a Patent in Japanese Application No. 2016-545828 mailed on Jan. 16, 2018, 5 pages.
The Extended European Search Report in European Application No. 14877111.6 mailed on Mar. 17, 2017, 6 pages.
First Examination Report in Indian Application No. 201617026062 mailed on Nov. 13, 2020, 6 pages.
Notice of Preliminary Rejection in Korean Application No. 10-2022-7010046 mailed on Jun. 20, 2022, 15 pages.

* cited by examiner

SYSTEMS AND METHODS FOR SUPPRESSING SOUND LEAKAGE

CROSS-REFERENCE TO RELATED APPLICATIONS

The present application is a continuation-in-part of U.S. patent application Ser. No. 17/656,220, filed on Mar. 23, 2022, which is a continuation of U.S. patent application Ser. No. 17/075,655 (now U.S. Pat. No. 11,304,011), filed on Oct. 20, 2020, which is a continuation-in-part of U.S. patent application Ser. No. 16/813,915 (now U.S. Pat. No. 10,848,878), filed on Mar. 10, 2020, which is a continuation of U.S. patent application Ser. No. 16/419,049 (now U.S. Pat. No. 10,616,696), filed on May 22, 2019, which is a continuation of U.S. patent application Ser. No. 16/180,020 (now U.S. Pat. No. 10,334,372), filed on Nov. 5, 2018, which is a continuation of U.S. patent application Ser. No. 15/650,909 (now U.S. Pat. No. 10,149,071), filed on Jul. 16, 2017, which is a continuation of U.S. patent application Ser. No. 15/109,831 (now U.S. Pat. No. 9,729,978), filed on Jul. 6, 2016, which is a U.S. National Stage entry under 35 U.S.C. ≡∫ 371 of International Application No. PCT/CN2014/094065, filed on Dec. 17, 2014, designating the United States of America, which claims priority to Chinese Patent Application No. 201410005804.0, filed on Jan. 6, 2014. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a vibration board 121, a transducer 122, and a linking component 123. The transducer 122 may transduce electrical signals to mechanical vibrations. The vibration board 121 may be connected to the transducer 122 and vibrate synchronically with the transducer 122. The vibration board 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the vibration board 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application discloses methods and system of reducing sound leakage of a bone conduction speaker.

In one aspect, the embodiments of the present application disclose a method of reducing sound leakage of a bone conduction speaker, including:

providing a bone conduction speaker including a vibration board fitting human skin and passing vibrations, a transducer, and a housing, wherein at least one sound guiding hole is located in at least one portion of the housing;

the transducer drives the vibration board to vibrate;

the housing vibrates, along with the vibrations of the transducer, and pushes air, forming a leaked sound wave transmitted in the air;

the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a vibration board and a transducer, wherein:

the transducer is configured to generate vibrations and is located inside the housing;

the vibration board is configured to be in contact with skin and pass vibrations;

At least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

In a further aspect, the embodiments of the present application disclose a method. The method may include providing a speaker. The speaker may include a housing. The speaker may further include a transducer residing inside the housing and configured to generate vibrations. The vibrations may produce a sound wave inside the housing and cause a leaked sound wave spreading outside the housing at least from a portion of the housing. And the speaker may further include at least one sound guiding hole located on the housing and configured to guide the sound wave inside the housing through the at least one sound guiding hole to an outside of the housing. The guided sound wave may have a phase different from a phase of the leaked sound wave. The guided sound wave may interfere with the leaked sound wave in a target region. And the interference may reduce a sound pressure level of the leaked sound wave in the target region. The housing and the at least one sound guiding hole may be constructed and arranged such that a sound path from the at least one sound guiding hole to a user's ear may be increased by part of the housing located between the at least one sound guiding hole and the user's ear. And a distance between the at least one sound guiding hole and the portion of the housing may be less than or equal to 10 cm.

In some embodiments, the housing may include a bottom or a sidewall. And the at least one sound guiding hole may be located on the bottom or the sidewall of the housing.

In some embodiments, the at least one sound guiding hole may be arranged on a wall of the housing different from a wall on which the portion of the housing is located.

In some embodiments, the at least one sound guiding hole and the portion of the housing may be located on a same side of the user's ear.

In some embodiments, the sound path from the at least one sound guiding hole to the user's ear may be larger than a sound path from the portion of the housing to the user's ear.

In some embodiments, a ratio of a distance between the at least one sound guiding hole and the user's ear to the distance between the at least one sound guiding hole and the portion of the housing may be less than or equal to 0.3.

In some embodiments, a ratio of a height of the part of the housing located between the at least one sound guiding hole and the portion of the housing to the distance between the at least one sound guiding hole and the portion of the housing may be less than or equal to 1.

In some embodiments, for a distance from a center point of the part of the housing located between the at least one sound guiding hole and the portion of the housing to a line connecting the at least one sound guiding hole and the portion of the housing, a ratio of the distance to the height of the part of the housing located between the at least one sound guiding hole and the portion of the housing may be less than or equal to 2.

In some embodiments, a location of the at least one sound guiding hole may be determined based on at least one of: a vibration frequency of the transducer, a shape of the at least one sound guiding hole, the target region, and/or a frequency range within which the sound pressure level of the leaked sound wave is to be reduced.

In some embodiments, the at least one sound guiding hole may include a damping layer. The damping layer may be configured to adjust the phase of the guided sound wave in the target region.

In a further aspect, the embodiments of the present application disclose a speaker. The speaker may include a housing. The speaker may further include a transducer residing inside the housing and configured to generate vibrations. The vibrations may produce a sound wave inside the housing and cause a leaked sound wave spreading outside the housing at least from a portion of the housing. And the speaker may further include at least one sound guiding hole located on the housing and configured to guide the sound wave inside the housing through the at least one sound guiding hole to an outside of the housing. The guided sound wave may have a phase different from a phase of the leaked sound wave. The guided sound wave may interfere with the leaked sound wave in a target region. And the interference may reduce a sound pressure level of the leaked sound wave in the target region. The housing and the at least one sound guiding hole may be constructed and arranged such that a sound path from the at least one sound guiding hole to a user's ear may be increased by part of the housing located between the at least one sound guiding hole and the user's ear. And a distance between the at least one sound guiding hole and the portion of the housing may be less than or equal to 10 cm.

In some embodiments, the housing may include a bottom or a sidewall. And the at least one sound guiding hole may be located on the bottom or the sidewall of the housing.

In some embodiments, the at least one sound guiding hole may be arranged on a wall of the housing different from a wall on which the portion of the housing is located.

In some embodiments, the at least one sound guiding hole and the portion of the housing may be located on a same side of the user's ear.

In some embodiments, the sound path from the at least one sound guiding hole to the user's ear may be larger than a sound path from the portion of the housing to the user's ear.

In some embodiments, a ratio of a distance between the at least one sound guiding hole and the user's ear to the distance between the at least one sound guiding hole and the portion of the housing may be less than or equal to 0.3.

In some embodiments, a ratio of a height of the part of the housing located between the at least one sound guiding hole and the portion of the housing to the distance between the at least one sound guiding hole and the portion of the housing may be less than or equal to 1.

In some embodiments, for a distance from a center point of the part of the housing located between the at least one sound guiding hole and the portion of the housing to a line connecting the at least one sound guiding hole and the portion of the housing, a ratio of the distance to the height of the part of the housing located between the at least one sound guiding hole and the portion of the housing may be less than or equal to 2.

In some embodiments, a location of the at least one sound guiding hole may be determined based on at least one of: a vibration frequency of the transducer, a shape of the at least one sound guiding hole, the target region, and/or a frequency range within which the sound pressure level of the leaked sound wave is to be reduced.

In some embodiments, the at least one sound guiding hole may include a damping layer. The damping layer may be configured to adjust the phase of the guided sound wave in the target region.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 121, vibration board; 122, transducer; 123, linking component; 210, first frame; 220, second frame; 230, moving coil; 240, inner magnetic component; 250, outer magnetic component; 260; vibration board; 270, vibration unit; 10, housing; 11, sidewall; 12, bottom; 21, vibration board; 22, transducer; 23, linking component; 24, elastic component; 30, sound guiding hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
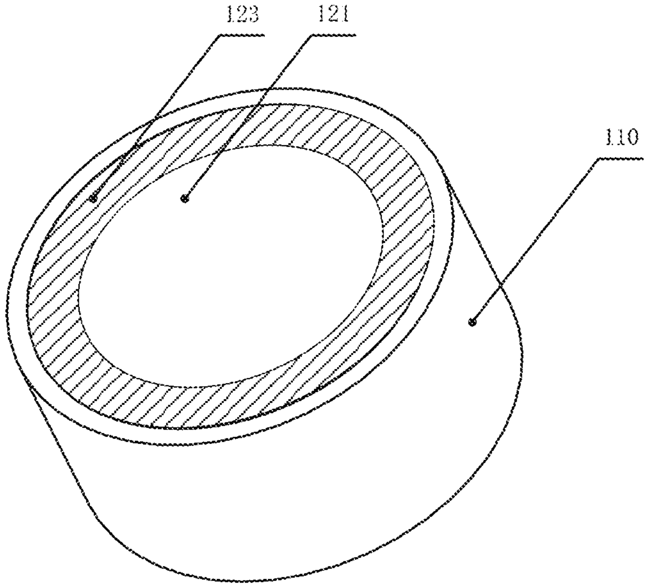
FIGS. 1A and 1B are schematic structures illustrating a bone conduction speaker of prior art.
Figure 1B:
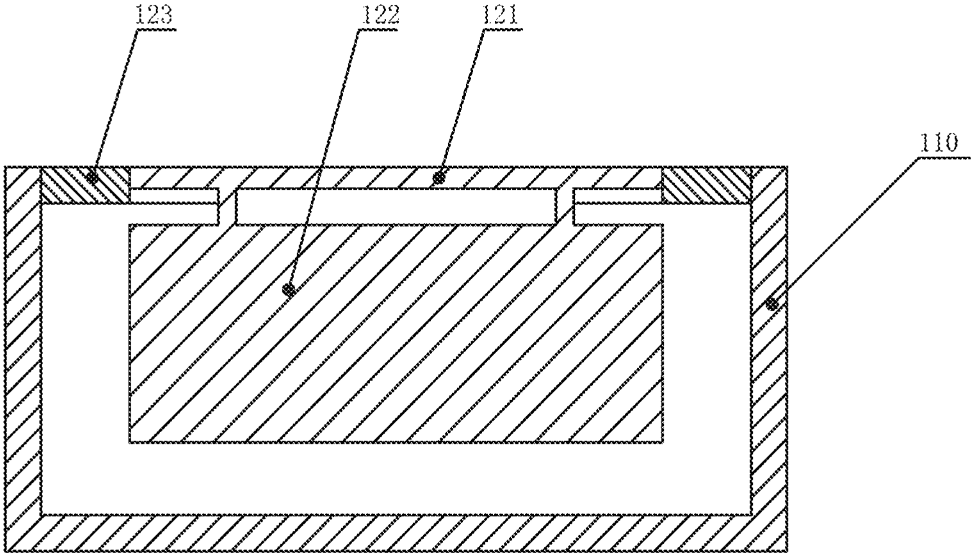
Figure 2:
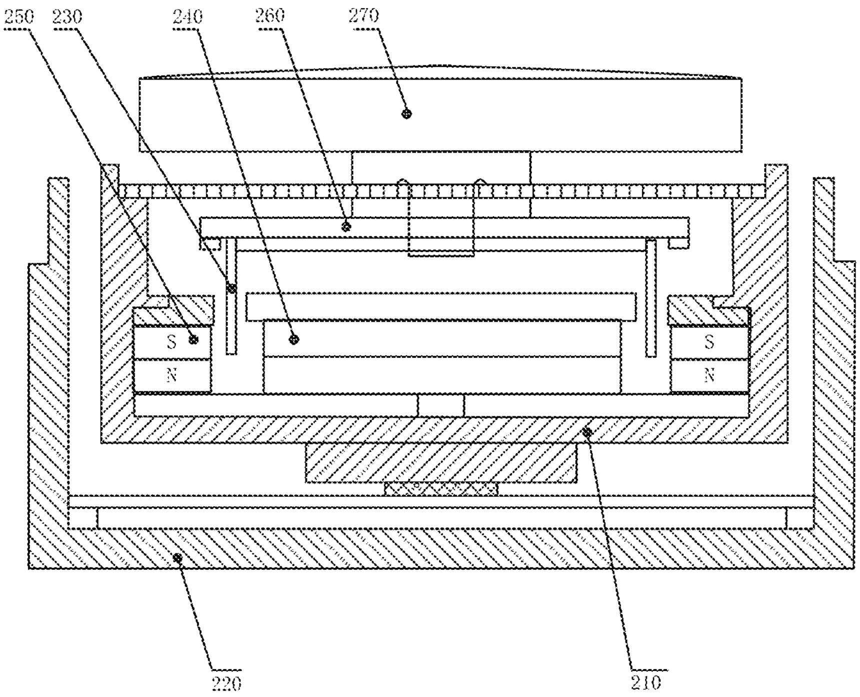
FIG. 2 is a schematic structure illustrating another bone conduction speaker of prior art.
Figure 3:
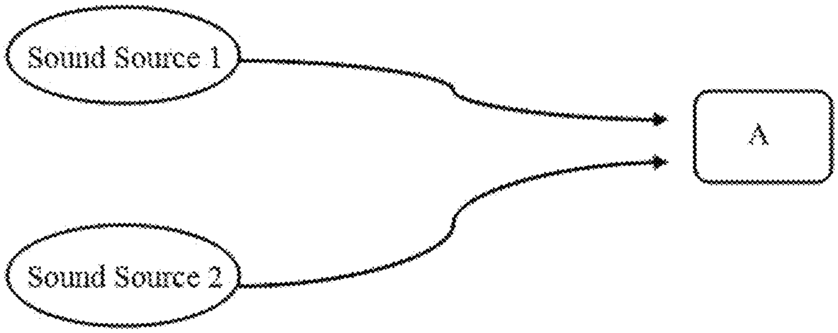
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage.

Embodiment One

Figure 4A:
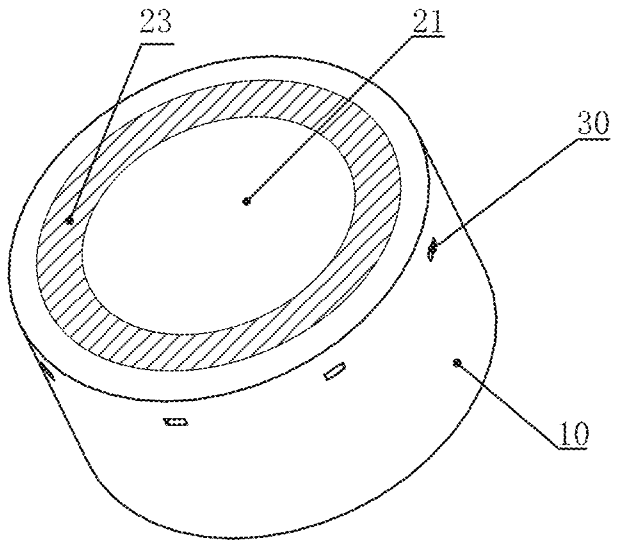
FIGS. 4A and 4B are schematic structures of an exemplary bone conduction speaker according to some embodiments of the present disclosure.
Figure 4B:
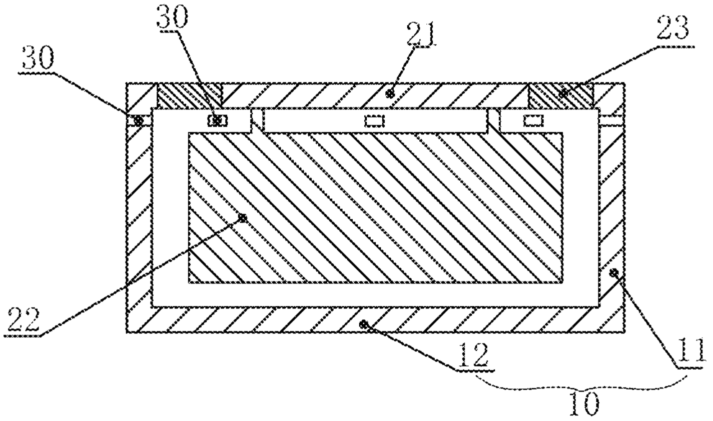

FIGS. 4A and 4B are schematic structures of an exemplary bone conduction speaker. The bone conduction speaker may include a housing 10, a vibration board 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the vibration board 21 may be connected to the transducer 22 and configured to vibrate along with the transducer 22. The vibration board 21 may stretch out from the opening of the housing 10, and touch the skin of the user and pass vibrations to auditory nerves through human tissues and bones, which in turn enables the user to hear sound. The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the vibration board 21 to vibrate. The transducer 22, which resides inside the housing 10, may vibrate. The vibrations of the transducer 22 may drives the air inside the housing 10 to vibrate, producing a sound wave inside the housing 10, which can be referred to as "sound wave inside the housing." Since the vibration board 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the vibration board 21) to about the ⅓ height of the sidewall.

Figure 4C:
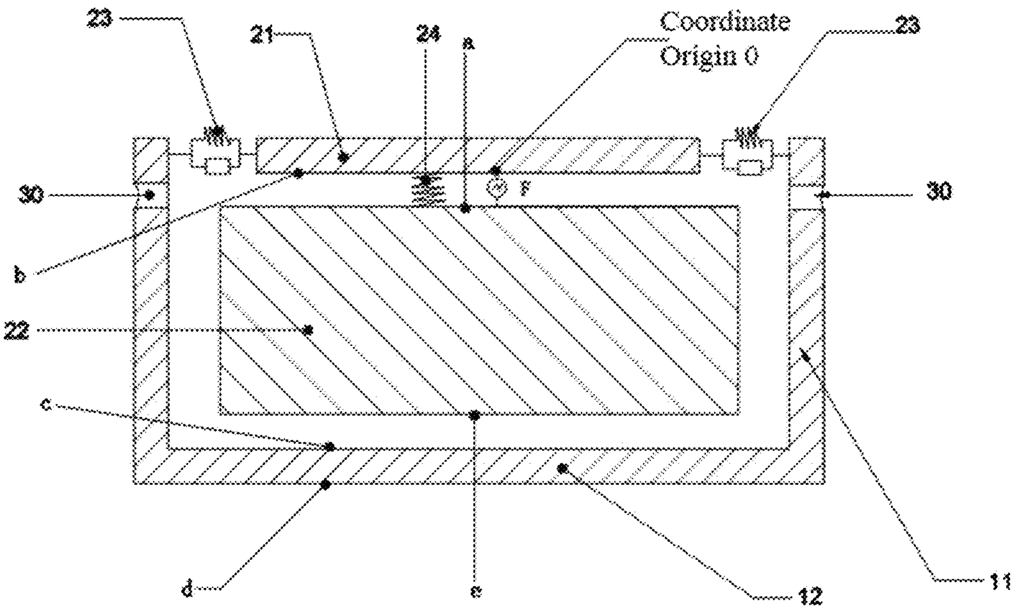
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the vibration board 21 may be represented by an elastic element 23 and a damping element in the parallel connection. The linking relationship between the vibration board 21 and the transducer 22 may be represented by an elastic element 24.

Outside the housing 10, the sound leakage reduction is proportional to $$\left(\iint_{S_{hole}} P ds - \iint_{S_{housing}} P_d ds\right) \quad (1)$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $$P = P_a + P_b + P_c + P_e \quad (2)$$

wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the vibration board 21, side b refers to the lower surface of the vibration board 21 that is close to the transducer 22, side c refers to the inner upper surface of the bottom 12 that is close to the transducer 22, and side e refers to the lower surface of the transducer 22 that is close to the bottom 12.

The center of the side b, O point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \iint_{S_a} W_a(x'_a, y'_a) \cdot \frac{e^{jkR(x'_a, y'_a)}}{4\pi R(x'_a, y'_a)} dx'_a dy'_a - P_{aR} \quad (3)$$

$$P_b(x, y, z) = -j\omega\rho_0 \iint_{S_b} W_b(x', y') \cdot \frac{e^{jkR(x', y)}}{4\pi R(x', y)} dx' dy' - P_{bR} \quad (4)$$

$$P_c(x, y, z) = -j\omega\rho_0 \iint_{S_c} W_c(x'_c, y'_c) \cdot \frac{e^{jkR(x'_c, y'_c)}}{4\pi R(x'_c, y'_c)} dx'_c dy'_c - P_{cR} \quad (5)$$

$$P_e(x, y, z) = -j\omega\rho_0 \iint_{S_e} W_e(x'_e, y'_e) \cdot \frac{e^{jkR(x'_e, y'_e)}}{4\pi R(x'_e, y'_e)} dx'_e dy'_e - P_{eR} \quad (6)$$

wherein $R(x', y') = \sqrt{(x-x')^2+(y-y')^2+z^2}$ is the distance between an observation point (x, y, z) and a point on side b (x', y', 0); $S_a$, $S_b$, $S_c$ and $S_e$ are the areas of side a, side b, side c and side e, respectively;

$R(x'_a, y'_a) = \sqrt{(x-x_a')^2+(y-y_a')^2+(z-z_a)^2}$ is the distance between the observation point (x, y, z) and a point on side a $(x'_a, y'_a, z_a)$;

$R(x'_c, y'_c) = \sqrt{(x-x_c')^2+(y-y_c')^2+(z-z_c)^2}$ is the distance between the observation point (x, y, z) and a point on side c $(x'_c, y'_c, z_c)$;

$R(x'_e, y'_e) = \sqrt{(x-x_e')^2+(y-y_e')^2+(z-z_e)^2}$ is the distance between the observation point (x, y, z) and a point on side e $(x'_e, y'_e, z_e)$;

$k=\omega/u$ (u is the velocity of sound) is wave number, $\rho_0$ is an air density, $\omega$ is an angular frequency of vibration;

$P_{aR}$, $P_{bR}$, $P_{cR}$ and $P_{eR}$ are acoustic resistances of air, which respectively are:

$$P_{aR} = A \cdot \frac{z_a \cdot r + j\omega \cdot z_a \cdot r'}{\varphi} + \delta \quad (7)$$

$$P_{bR} = A \cdot \frac{z_b \cdot r + j\omega \cdot z_b \cdot r'}{\varphi} + \delta \quad (8)$$

$$P_{cR} = A \cdot \frac{z_c \cdot r + j\omega \cdot z_c \cdot r'}{\varphi} + \delta \quad (9)$$

$$P_{eR} = A \cdot \frac{z_e \cdot r + j\omega \cdot z_e \cdot r'}{\varphi} + \delta \quad (10)$$

wherein r is the acoustic resistance per unit length, r' is the sound quality per unit length, $z_a$ is the distance between the observation point and side a, $z_b$ is the distance between the observation point and side b, $z_c$ is the distance between the observation point and side c, $z_e$ is the distance between the observation point and side e.

$W_a(x, y)$, $W_b(x, y)$, $W_c(x, y)$, $W_e(x, y)$ and $W_d(x, y)$ are the sound source power per unit area of side a, side b, side c, side e and side d, respectively, which can be derived from following formulas (11):

$$F_e = F_a = F - k_1 \cos \omega t - \iint_{S_a} W_a(x,y)dxdy - \iint_{S_e} W_e(x,y)dxdy - f$$

$$F_b = -F + k_1 \cos \omega t + \iint_{S_b} W_b(x,y)dxdy - \iint_{S_e} W_e(x,y)dxdy - L$$

$$F_c = F_d = F_b - k_2 \cos \omega t - \iint_{S_c} W_c(x,y)dxdy - f - \gamma$$

$$F_d = F_b - k_2 \cos \omega t - \iint_{S_d} W_d(x,y)dxdy \quad (11)$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 12. $S_d$ is the region of side d, f is the viscous resistance formed in the small gap of the sidewalls, and $f=\eta\Delta s(dv/dy)$.

L is the equivalent load on human face when the vibration board acts on the human face, $\gamma$ is the energy dissipated on elastic element 24, $k_1$ and $k_2$ are the elastic coefficients of elastic element 23 and elastic element 24 respectively, $\eta$ is the fluid viscosity coefficient, dv/dy is the velocity gradient of fluid, $\Delta s$ is the cross-section area of a subject (board), A is the amplitude, $\varphi$ is the region of the sound field, and $\delta$ is a high order minimum (which is generated by the incompletely symmetrical shape of the housing);

The sound pressure of an arbitrary point outside the housing, generated by the vibration of the housing 10 is expressed as:

$$P_d = -j\omega\rho_0 \int\int W_d(x'_d, y'_d) \cdot \frac{e^{jkR(x'_d, y'_d)}}{4\pi R(x'_d, y'_d)} dx'_d dy'_d \tag{12}$$

wherein $R(x'_d, y'_d)=\sqrt{(x-x_d')^2+(y-y_d')^2+(z-z_d)^2}$ is the distance between the observation point (x, y, z) and a point on side d $(x'_d, y'_d, z_d)$.

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}} P ds$.

In the meanwhile, because the vibration board 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing 10 may be expressed as $\iint_{S_{housing}} P_d ds$.

The leaked sound wave and the guided sound wave interference may result in a weakened sound wave, i.e., to make $\iint_{S_{hole}} P ds$ and $\iint_{S_{housing}} P_d ds$ have the same value but opposite directions, and the sound leakage may be reduced. In some embodiments, $\iint_{S_{hole}} P ds$ may be adjusted to reduce the sound leakage. Since $\iint_{S_{hole}} P ds$ corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

Additionally, because of the basic structure and function differences of a bone conduction speaker and a traditional air conduction speaker, the formulas above are only suitable for bone conduction speakers. Whereas in traditional air conduction speakers, the air in the air housing can be treated as a whole, which is not sensitive to positions, and this is different intrinsically with a bone conduction speaker, therefore the above formulas are not suitable to an air conduction speaker.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
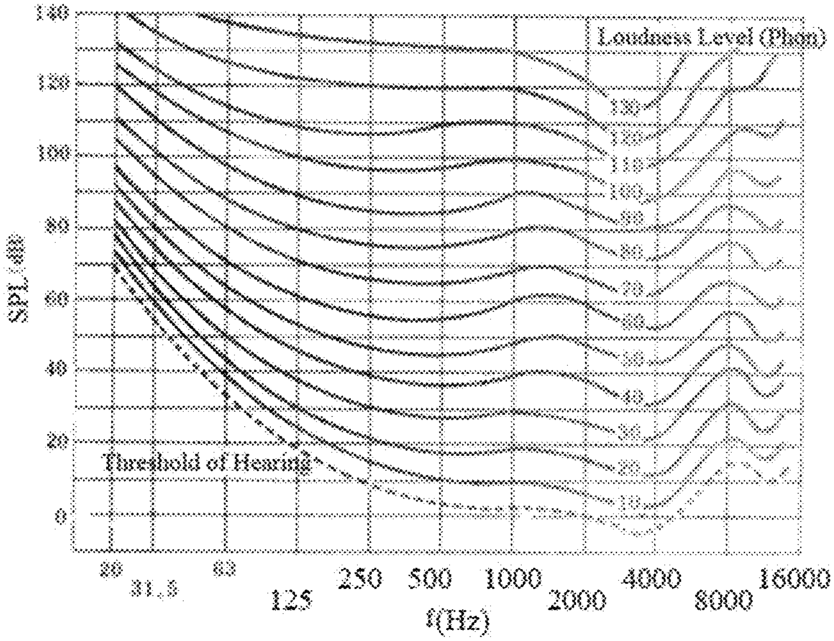
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
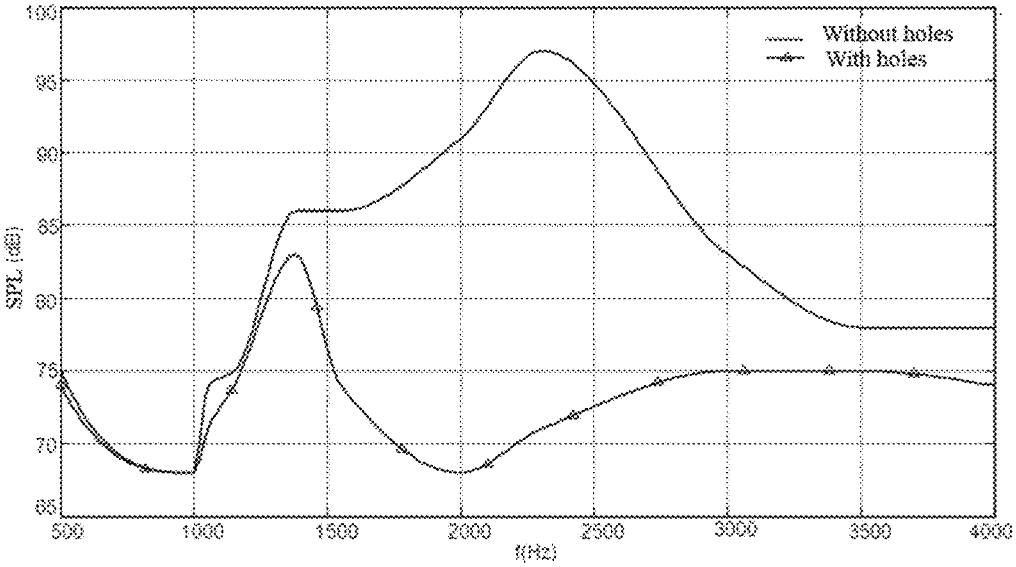
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 20 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz~3000 Hz, the sound leakage is reduced by over 10 dB. In the frequency range of 2000 Hz~2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

Merely by way of example, as shown in FIG. 4A and FIG. 4B, the housing 10 may be cylindrical. Two or more sound guiding holes 30 may be arranged symmetrically and/or evenly in a circle on the sidewall 11 of the housing 10. The circle or a line connecting any two sound guiding holes in the two or more sound guiding holes 30 may be parallel to the bottom 12 of the housing 10. That is, the sound guiding holes 30 may have a same or approximately same distance to the bottom 12 of the housing 10. As used herein, the distance between a sound guiding hole 30 and the bottom 12 refers to a straight line distance between the sound guiding hole 30 and a point (e.g., a point that may be acoustically equivalent to the bottom 12, such as a center point) on the bottom 12. In some embodiments, a difference between the distances from any two sound guiding holes 30 to the bottom 12 may be less than 5 mm. In some embodiments, the difference between the distances from any two sound guiding holes 30 to the bottom 12 may be less than 3 mm. In some embodiments, a difference between the distances from any two sound guiding holes 30 to the bottom 12 may be less than 1 mm. In some embodiments, the difference between the distances from any two sound guiding holes 30 to the bottom 12 may be less than 0.5 mm.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

Embodiment Two

Figure 6:
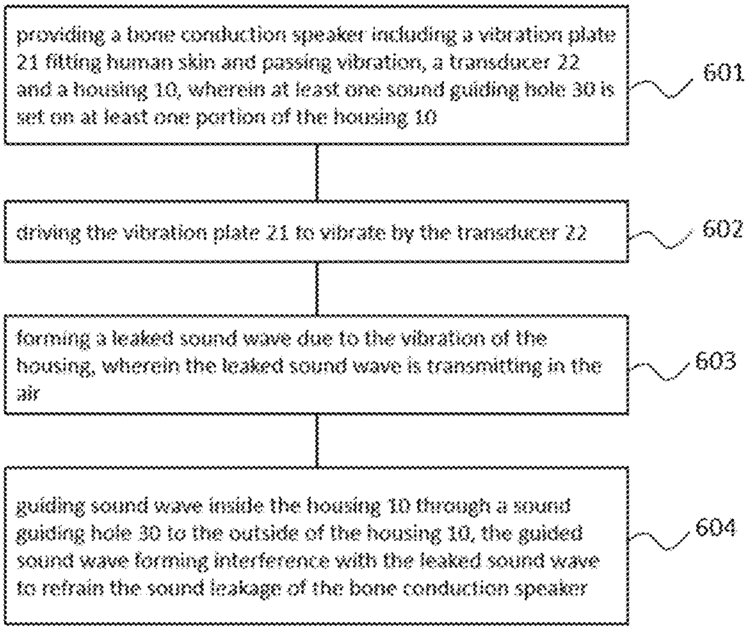
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a vibration plate 21 touching human skin and passing vibrations, a transducer 22, and a housing 10 is provided. At least one sound guiding hole 30 is arranged on the housing 10. At 602, the vibration plate 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

According to the method provided in some embodiments of the present disclosure, a portion of the housing (e.g., the bottom 12, or other sides of the housing) from which the leaked sound wave is spread outside the housing may be regarded as sound source 1 illustrated in FIG. 3. And the at least one sound guiding hole 30 configured to guide the sound wave inside the housing through the at least one sound guiding hole to an outside of the housing may be regarded as sound source 2 illustrated in FIG. 3. The guided sound wave may have a phase different from a phase of the leaked sound wave. And the guided sound wave may interfere with the leaked sound wave in a target region so as to reduce a sound pressure level of the leaked sound wave in the target region. That is, the sound leakage in the target region may be reduced.

In some embodiments, as described in connection with FIG. 4A and FIG. 4B, there may be two or more sound guiding holes 30. That is, a count of the sound source(s) 2 may be two or more. Moreover, the two or more sound guiding holes 30 may have a same or approximately same distance to the bottom 12. Correspondingly, the two or more sound sources 2 may have a same or approximately same distance to the sound source 1. In some embodiments, a difference between the distances from any two sound sources 2 to sound source 1 may be less than 5 mm. In some embodiments, the difference between the distances from any two sound sources 2 to sound source 1 may be less than 3 mm. In some embodiments, a difference between the distances from any two sound guiding holes 30 to sound source 1 may be less than 1 mm. In some embodiments, the difference between the distances from any two sound sources 2 to sound source 1 may be less than 0.5 mm.

In some embodiments, a sound volume caused by the guided sound wave and the leaked sound wave at point A illustrated in FIG. 3 may be related to a distance between point A and sound source 1, and a distance between point A and sound source 2, respectively. Merely by way of example, if the distance between point A and sound source 1 is not equal to the distance between point A and sound source 2, the larger the difference between the two distances is, the greater the sound volume at point A may be. On the other hand, if the distance between point A and sound source 1 is equal to the distance between point A and sound source 2, the phases of the guided sound wave and the leaked sound wave may be opposite at point A, a sound with a low volume may be generated at point A according to a principle of reversed-phase cancellation. That is, the sound pressure level of the leaked sound wave at point A may be reduced. In some embodiments, the target region where the sound leakage is to be reduced may be relatively far from the two sound sources (e.g., 50 cm away from the outside of the bottom of the housing). A distance between the target region and sound source 1 may be considered to be equal to or approximately equal to a distance between the target region and sound source 2. On this occasion, the sound leakage in the target region may be reduced by the two sound sources.

In some embodiments, when the size of each of the at least one sound guiding hole is relatively small, each of the at least one sound guiding holes may be regarded as a point sound source. In some embodiments, when an area of a sound guiding hole is relatively large, the sound guiding hole may be regarded as a planar acoustic source. In some embodiments, the point sound source may also be realized by other structures, such as a vibration surface (e.g., the bottom of the housing), a sound radiation surface, etc. It may be known that the sound produced by a structure such as the sound guiding hole, the vibration surface, and the acoustic radiation surface may be equivalent to the point sound source in the spatial scale discussed in the present disclosure, which may have consistent sound propagation characteristics and a same mathematical description method. In some embodiments, a sound pressure p generated by a single-point sound source may be represented by Equation (13) below:

$$p = \frac{j\omega\rho_0}{4\pi r}Q_0\exp j(\omega t - kr), \tag{13}$$

where ω represents an angular frequency, $\rho_0$ represents an air density, r represents a distance between a target point and the single-point sound source, $Q_0$ represents a volume velocity of the single-point sound source, and k represents a wave number. It may be concluded that a magnitude of the sound pressure of a sound field of the point sound source is inversely proportional to the distance from the target point to the point sound source.

As mentioned above, two sound sources (also referred to as "two-point sound sources") may be disposed on an acoustic output device to reduce sound transmitted to the surroundings. The acoustic output device may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources. It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker. In some embodiments, sounds output from two-point sound sources may have a certain phase difference. When positions of the two-point sound sources and/or the phase difference of the two-point sound sources meet a certain condition, the two-point sound sources may perform different sound effects in the near field and the far field. For example, when phases of the point sound sources are opposite, that is, an absolute value of the phase difference between the two-point sound sources is 180 degrees, the sound leakage in the far field may be reduced according to a principle of reversed-phase cancellation. As another example, when a distance between the two-point sound sources increases, a difference between sound pressure amplitudes (i.e., sound pressure difference) between the two sounds reaching a listening position (e.g., a user's ear) in the near field may be increased, and a difference of sound paths may be increased, thereby reducing the sound cancellation and increasing the sound leakage at the listening position in the near field. In such cases, the sound leakage at the listening position may be used as a compensation for the sound generated by the vibration board 21 and conducted through human tissues and bones. For illustration purposes, the sound leakage at the listening position may also be referred to as sound reaching the listening position or sound listened by the user.

Figure 14:
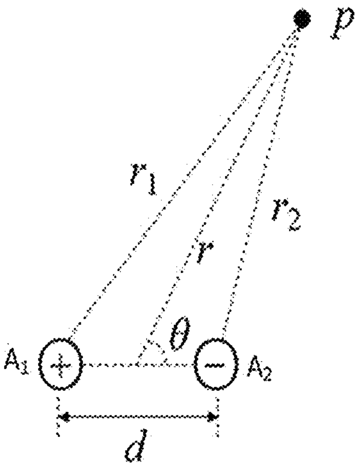
FIG. 14 is a schematic diagram illustrating an interaction between two-point sound sources according to some embodiments of the present disclosure.

As shown in FIG. 14, a sound pressure p generated by a two-point sound sources may be represented by Equation (14) below:

$$p = \frac{A_1}{r_1}\exp j(\omega t - kr_1 + \varphi_1) + \frac{A_2}{r_2}\exp j(\omega t - kr_2 + \varphi_2), \tag{14}$$

where $A_1$ and $A_2$ represent the intensity of each of the two-point sound sources, $\varphi_1$ and $\varphi_2$ represent phases of the two-point sound sources, respectively, and d represents a distance between the two-point sound sources. $r_1$ and $r_2$ may be represented by Equation (15) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \tag{15}$$

where r represents a distance between a target point and a center of the two-point sound sources, and θ represents an angle formed by a line connecting the target point and the center of the two-point sound sources and a line on which the two-point sound sources are located.

It may be known from Equation (15) that a value of the sound pressure p of the target point in the sound field may be related to the intensity of each of the point sound sources, the distance d, the phase, and the distance between the target point and the sound source.

Figure 15:
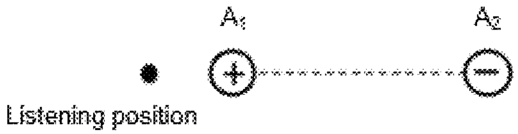
FIG. 15 is a schematic diagram illustrating point sound sources and a listening position according to some embodiments of the present disclosure.
Figure 16:
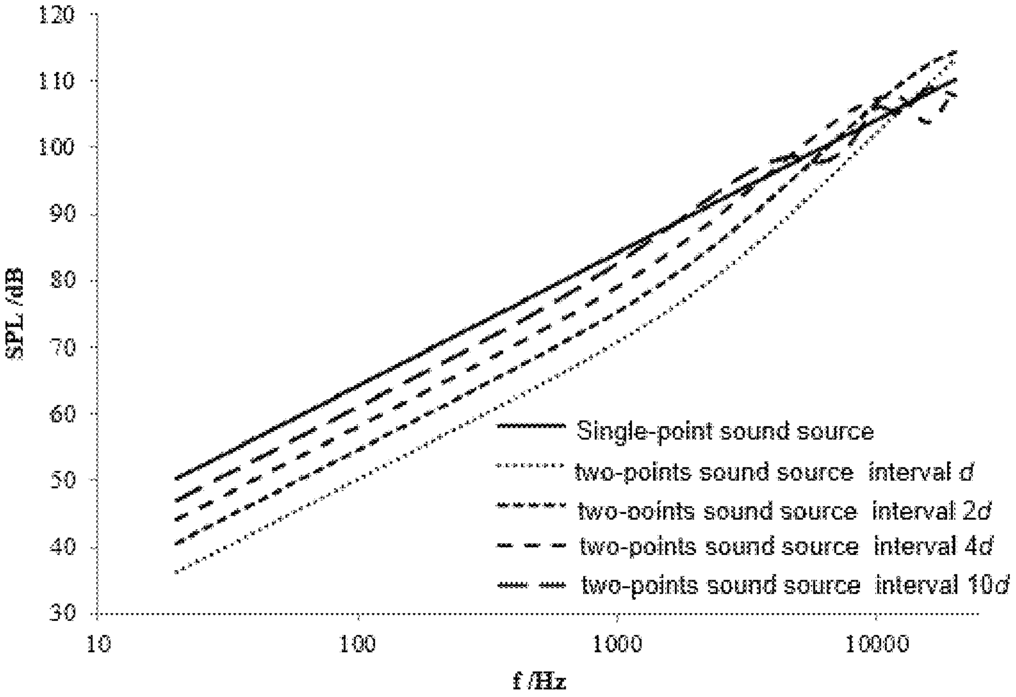
FIG. 16 is a schematic diagram illustrating frequency response characteristic curves of two two-point sound sources with different distances in a listening position in a near field according to some embodiments of the present disclosure.

FIG. 15 is a schematic diagram illustrating an exemplary two-point sound sources and a listening position according to some embodiments of the present disclosure. FIG. 16 is a schematic diagram illustrating frequency response characteristic curves of two two-point sound sources with different distances in a listening position in a near field according to some embodiments of the present disclosure. In some embodiments, the listening position may be regarded as a target point to further explain a relationship between a sound pressure at the target point and the distance d between the point sound sources. The listening position may be used to indicate a position of an ear of a user, that is, a sound at the listening position may be used to indicate a sound in the near field generated by the two-point sound sources. It should be noted that "a sound in the near field" may refer to a sound within a certain distance from a sound source (e.g., the at least one sound guiding hole or the portion of the housing which may be regarded as a point sound source), for example, a sound within 0.2 m from the sound source. Merely by way of example, as shown in FIG. 15, the point sound source $A_1$ and the point sound source $A_2$ may be on a same side of the listening position. The point sound source $A_1$ may be closer to the listening position, and the point sound source $A_1$ and the point sound source $A_2$ may output sounds with a same amplitude and opposite phases. As shown in FIG. 16, as the distance between the point sound source $A_1$ and the point sound source $A_2$ gradually increases (e.g., from d to 10d), a sound volume at the listening position may be gradually increased. As the distance between the point sound source $A_1$ and the point sound source $A_2$ increases, a difference between sound pressure amplitudes (i.e., sound pressure difference) between the two sounds reaching the listening position may be increased, and a difference of sound paths may be increased, thereby reducing the sound cancellation and increasing the sound volume of the listening position. Due to the existence of the sound cancellation, the sound volume at the listening position may be less than that generated by a single-point sound source with a same intensity as the two-point sound sources in a middle-low-frequency (e.g., less than 1000 Hz). For a high-frequency (e.g., close to 10000 Hz), a wavelength of the sound may be decreased, a condition for enhancing the sound may be formed, and the sound volume of the listening position generated by the two-point sound sources may be greater than that generated by the single-point sound source. As used herein, the sound pressure amplitude (i.e., a sound pressure) may refer to a pressure generated by the sound through the vibration of the air.

Figure 17:
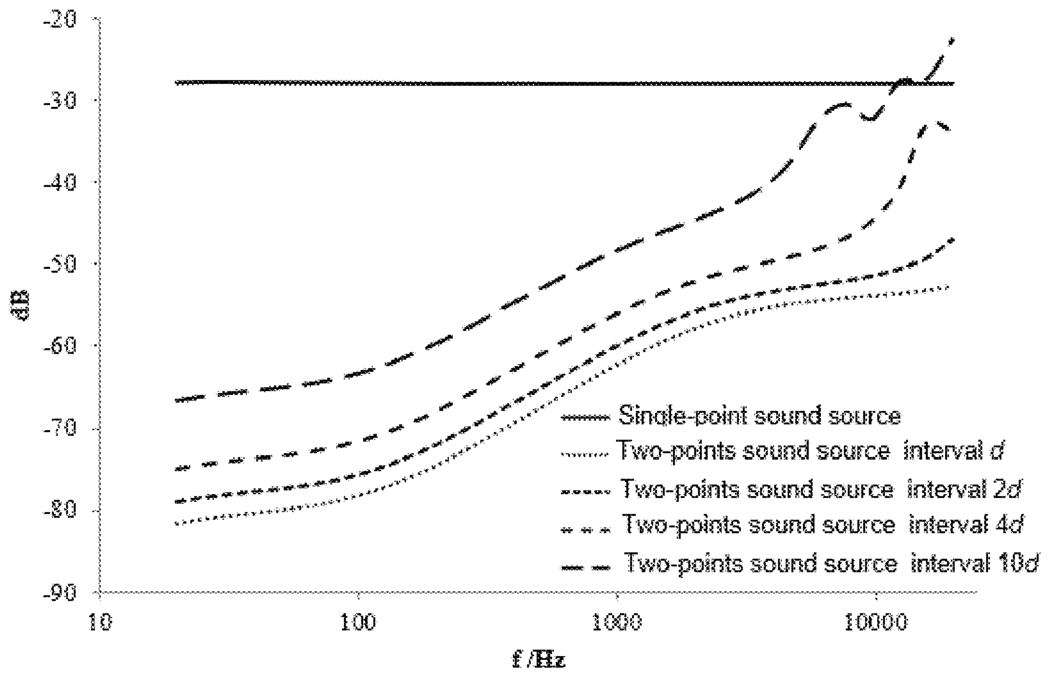
FIG. 17 is a schematic diagram illustrating exemplary sound leakage parameters of two-point sound sources with different distances in a far field according to some embodiments of the present disclosure.

In some embodiments, the sound volume at the listening position may be increased by increasing the distance between the two-point sound sources (e.g., the point sound source $A_1$ and the point sound source $A_2$). As the distance increases, the sound cancellation of the two-point sound sources may be weakened, thereby increasing sound leakage in the far field. For illustration purposes, FIG. 17 is a schematic diagram illustrating exemplary sound leakage parameters of two-point sound sources with different distances in the far field according to some embodiments of the present disclosure. As shown in FIG. 17, taking a sound leakage parameter of a single-point sound source in the far field as a reference, as the distance between the two-point sound sources increases from d to 10d, the sound leakage parameter in the far field may be gradually increased, which may indicate that the sound leakage may be gradually increased. More descriptions regarding the sound leakage parameter may refer to Equation (16) and related descriptions.

Figure 18:
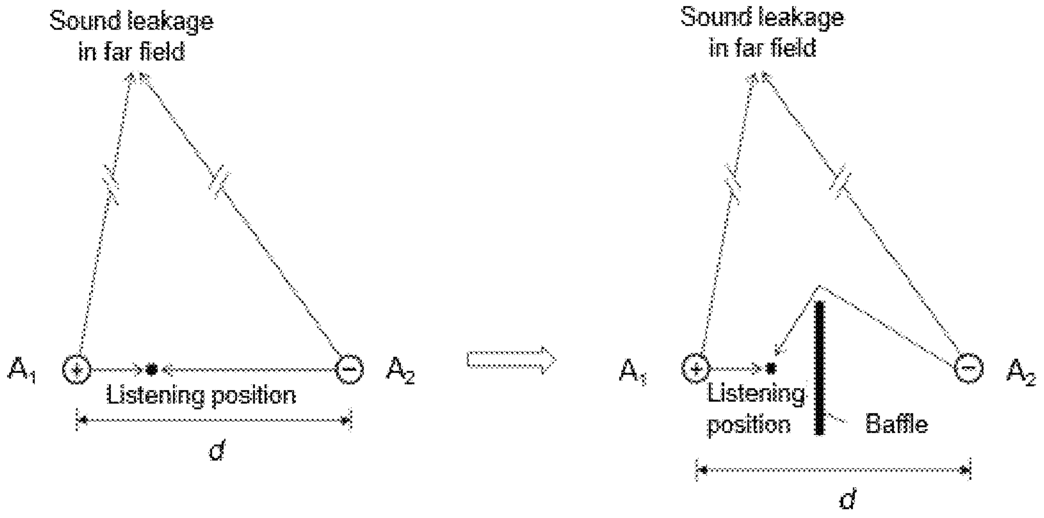
FIG. 18 is a schematic diagram illustrating an exemplary baffle disposed between the two-points sound sources according to some embodiments of the present disclosure.

In some embodiments, a baffle may be disposed between the two-point sound sources so as to improve an output effect of an acoustic output device, that is, to increase the sound intensity of the listening position in the near field and reduce the sound leakage in the far field. FIG. 18 is a schematic diagram illustrating an exemplary baffle disposed between the two-points sound sources according to some embodiments of the present disclosure. As shown in FIG. 18, when the baffle is disposed between a point sound source $A_1$ and a point sound source $A_2$, a sound field of the point sound source $A_2$ may bypass the baffle to interfere with a sound wave of the point sound source $A_1$ at a listening position in the near field, which may increase a sound path between the point sound source $A_2$ and the listening position. Assuming that the point sound source $A_1$ and the point sound source $A_2$ have a same amplitude, an amplitude difference between the sound waves of the point sound source $A_1$ and the point sound source $A_2$ at the listening position may be greater than that in a case without a baffle, thereby reducing a sound cancellation of the two sounds at the listening position, increasing a sound volume at the listening position. In the far field, the sound waves generated by the point sound source $A_1$ and the point sound source $A_2$ may not bypass the baffle in a relatively large space, the sound waves may be interfered (as a case without the baffle). Compared to the case without the baffle, the sound leakage in the far field may be not increased significantly. Therefore, the baffle being disposed between the point sound source $A_1$ and the point sound source $A_2$ may significantly increase the sound volume at the listening position in the near field and not significantly increase the sound leakage in the far field.

Figure 7A:
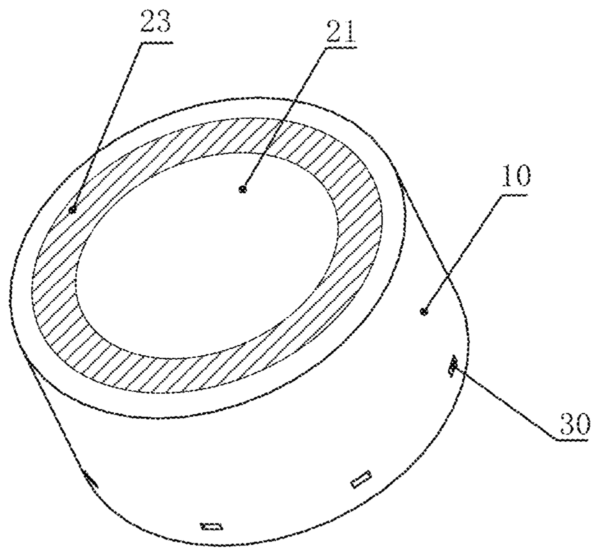
FIGS. 7A and 7B are schematic structures of an exemplary bone conduction speaker according to some embodiments of the present disclosure.

In some embodiments, the housing and the at least one sound guiding hole described in connection with various embodiments of the present disclosure may be constructed and arranged such that a sound path from the at least one sound guiding hole to a user's ear is increased by part of the housing located between the at least one sound guiding hole and the user's ear. Specifically, the at least one sound guiding hole may be arranged on a wall of the housing different from the wall on which the portion of the housing spreading the leaked sound wave is located. In such cases, the at least one sound guiding hole and the portion of the housing may be regarded as two-point sound sources. The part of the housing located between the at least one sound guiding hole and the portion of the housing may be regarded as the baffle, which may increase a sound path from one of the two-point sound sources to a user's ear. Merely by way of example, as shown in FIG. 7A and/or FIG. 8A, a plurality of sound guiding holes 30 may be arranged on the sidewall of the bone conduction speaker. Each of the plurality of sound guiding holes 30 may be regarded as one point sound source. The bottom of the bone conduction speaker may be regarded as another point sound source. Part of the housing between the two point sound sources (e.g., a corner between a sound guiding hole and the bottom of the bone conduction speaker) may be regarded as a baffle, which may increase a sound path from one of the two point sound sources to a user's ear. Specifically, taking FIG. 8B as an example, when the bone conduction speaker is worn by a user whose ear is on the right side of the housing 10, the leftmost sound guiding hole located on the sidewall 11 is considered as facing away from the user's ear. In such cases, the sound path between the leftmost sound guiding hole and the user's ear is increased by the bottom left corner of the housing 10 and is longer than the sound path between the bottom 12 of the housing 10 and the user's ear.

More descriptions regarding the sound leakage parameter (s) may be found in the following descriptions. In an application of an open ear acoustic output device, a sound pressure $P_{ear}$ transmitted to the listening position may be large enough to meet the listening requirements, and a sound pressure $P_{far}$ radiated to the far field may be small enough to reduce the sound leakage. A sound leakage parameter a may be taken as a parameter for evaluating a capability to reduce the sound leakage, and the sound leakage parameter a may be represented by Equation (16) below:

$$\alpha = \frac{|P_{far}|^2}{|P_{ear}|^2}, \tag{16}$$

It can be known from Equation (16) that the smaller the sound leakage parameter, the stronger the leakage reduction ability of the acoustic output device. The sound leakage in the far field may be smaller when a volume of a sound at the listening position in a near field is same.

Figure 19:
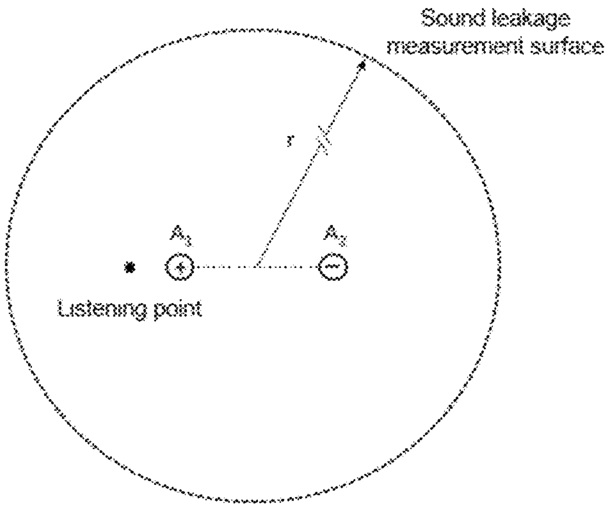
FIG. 19 is a schematic diagram illustrating a measurement of a sound leakage parameter according to some embodiments of the present disclosure.

FIG. 19 is a schematic diagram illustrating a measurement of a sound leakage parameter according to some embodiments of the present disclosure. As shown in FIG. 19, a listening position may be located at the left of the point source $A_1$. A method for measuring the sound leakage may include selecting an average value of sound pressure amplitudes of points located on a spherical surface with a center of two-point sound source (e.g., denoted by $A_1$ and $A_2$ as shown in FIG. 19) as a center and the radius r as a value of the sound leakage. It should be noted that the method for measuring the sound leakage in this embodiment is merely an example of the principle and effect, and not tended to limit the scope of the present disclosure. The method for measuring the sound leakage may also be adjusted according to an actual situation. For example, one or more points in a far field may be used to measure the sound leakage. As another example, an intermediate point of the two-point sound sources may be taken as a center of a circle, and two or more points are uniformly taken in the far field according to a certain spatial angle, and the sound pressure amplitudes of the points may be averaged as the value of the sound leakage. In some embodiments, a method for measuring a heard sound may include selecting a position near the point sound source(s) as the listening position, and an amplitude of a sound pressure measured at the listening position as a value of the heard sound. In some embodiments, the listening position may be on a line connecting the two-point sound sources, or may not be on the line. The method for measuring the heard sound may be reasonably adjusted according to the actual situation. For example, sound pressure amplitudes of one or more other points of the near field position may be averaged as the value of the heard sound. As another example, one of the point sound sources may be taken as a center of a circle, and two or more points may be uniformly taken in the near field according to a certain spatial angle, the sound pressure amplitudes of the points may be averaged as the value of the heard sound. In some embodiments, a distance between the listening position in the near field and the point sound source(s) may be less than a distance between the point sound source(s) and the spherical surface.

In order to further explain an effect on the acoustic output of an acoustic output device with or without a baffle between two-point sound sources, a volume of a sound at the listening position in a near field and/or a volume of sound leakage in a far field under different conditions may be described below.

Figure 20:
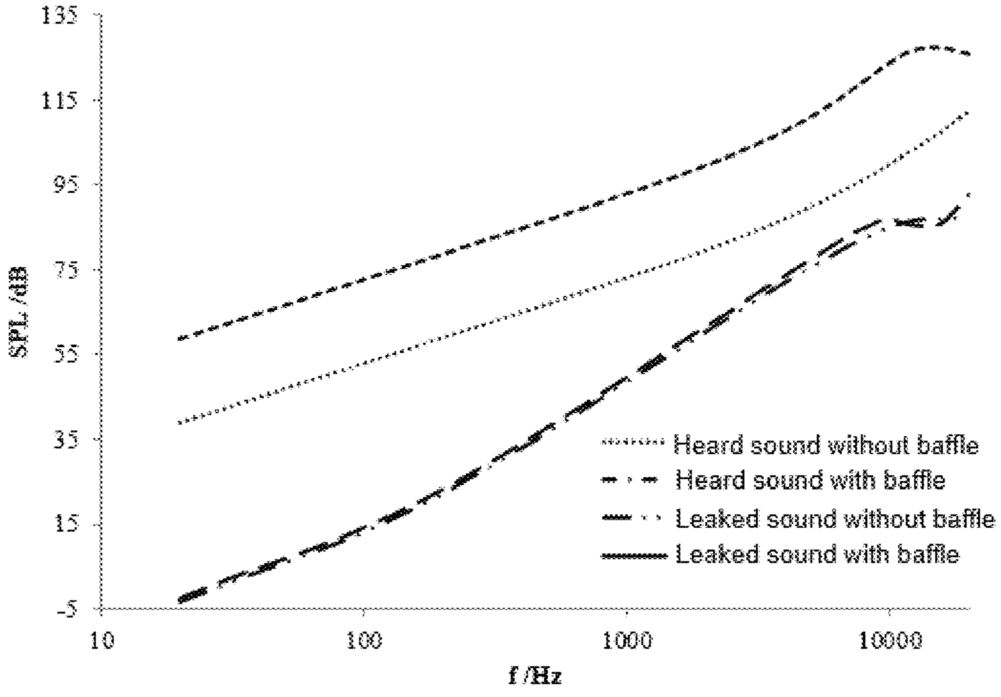
FIG. 20 is a schematic diagram illustrating exemplary frequency response characteristic curves of two-point sound sources when a baffle is disposed and not disposed between the two-point sound sources according to some embodiments of the present disclosure.

FIG. 20 is a schematic diagram illustrating exemplary frequency response characteristic curves of two-point sound sources when a baffle is disposed and not disposed between the two-point sound sources. As shown in FIG. 20, when the baffle is disposed between the two-point sound sources, a distance between the two-point sound sources may be increased in the near field, and the volume of the sound at the listening position in the near field may be equivalent to being generated by two-point sound sources with a relatively large distance, thereby increasing the volume of the sound in the near field compared to a case without the baffle. In the far field, the interference of sound waves generated by the two-point sound sources may be not significantly affected by the baffle, the sound leakage may be regarded as being generated by a set of two-point sound sources with a relatively small distance, and the sound leakage may be not changed significantly with or without the baffle. The baffle disposed between the two-point sound sources may improve the performance of the acoustic output device of reducing the sound leakage, and increase the volume of the sound in the near field, thereby reducing requirements for a component that plays an acoustic role in the acoustic output device, simplifying a circuit structure of the acoustic output device, reducing electrical loss of the acoustic output device, and prolonging a working time of the acoustic output device.

Figure 21:
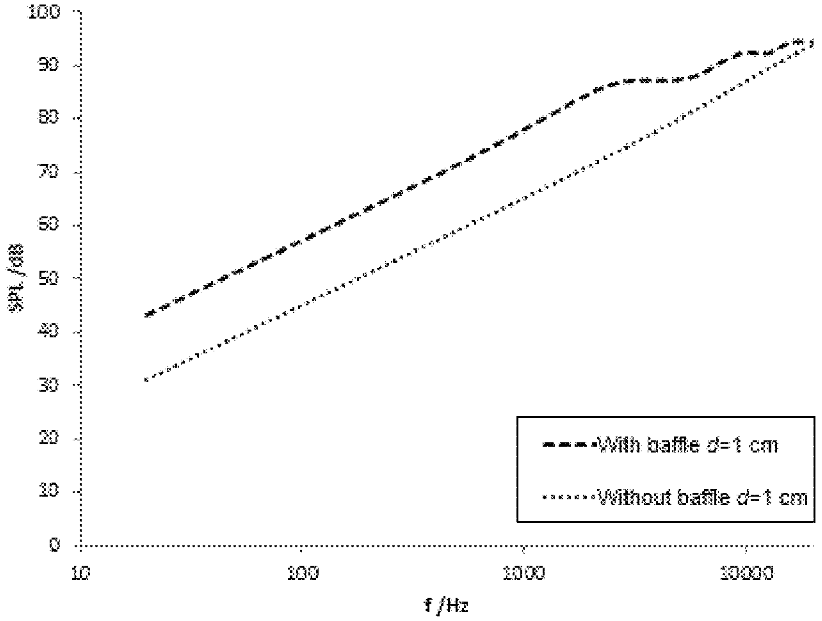
FIG. 21 is a schematic diagram illustrating exemplary frequency response characteristic curves in a near field when a distance d between two-point sound sources is 1 cm according to some embodiments of the present disclosure.
Figure 22:
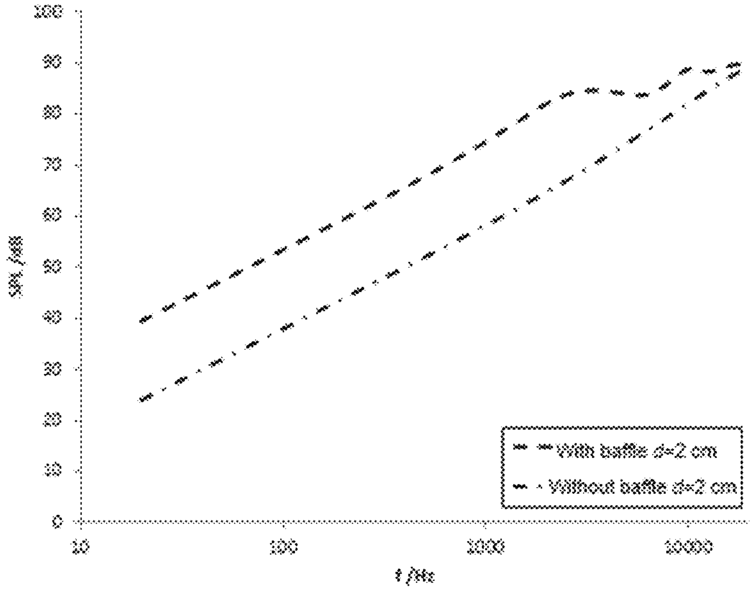
FIG. 22 is a schematic diagram illustrating exemplary frequency response characteristic curves in a near field when a distance d between two-point sound sources is 2 cm according to some embodiments of the present disclosure.
Figure 23:
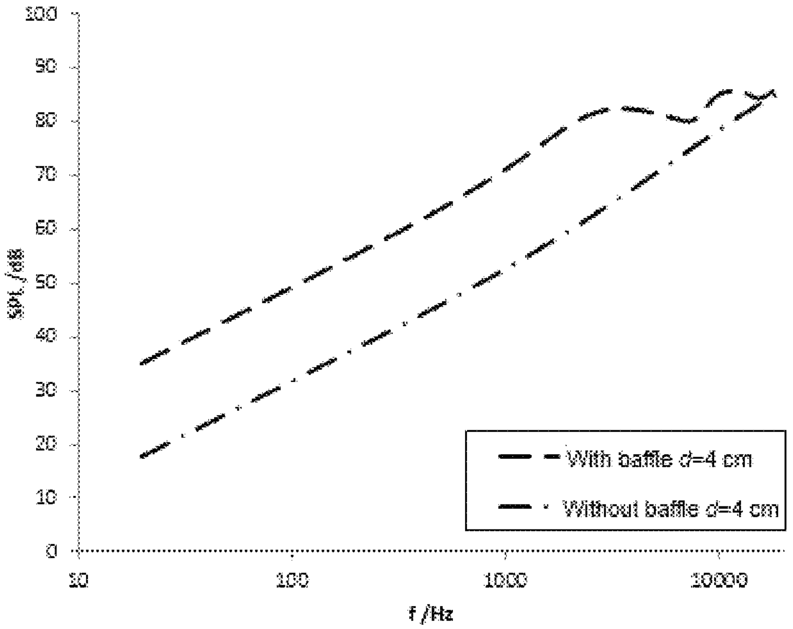
FIG. 23 is a schematic diagram illustrating exemplary frequency response characteristic curves in a near field when a distance d between two-point sound sources is 4 cm according to some embodiments of the present disclosure.
Figure 24:
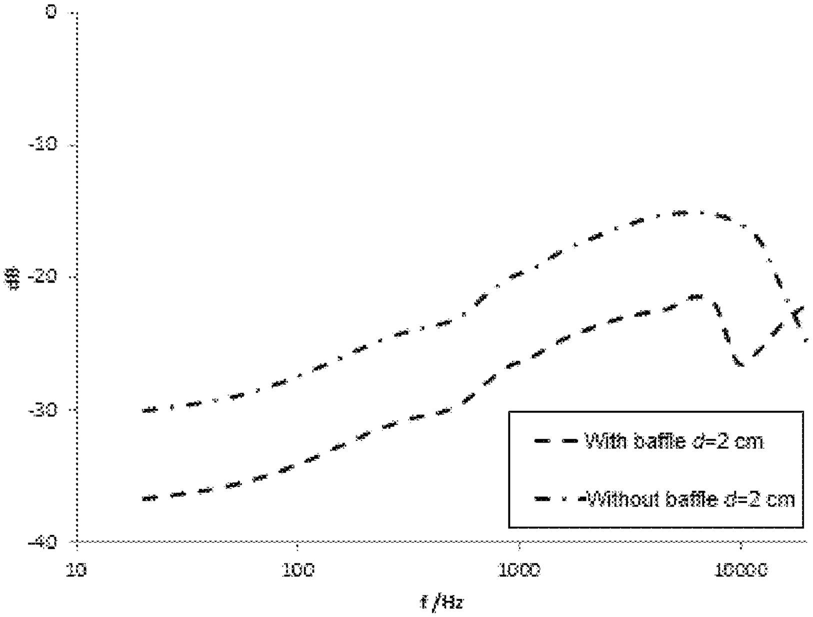
FIG. 24 is a schematic diagram illustrating exemplary frequency response characteristic curves in a far field when a distance d between two-point sound sources is 2 cm according to some embodiments of the present disclosure.
Figure 25:
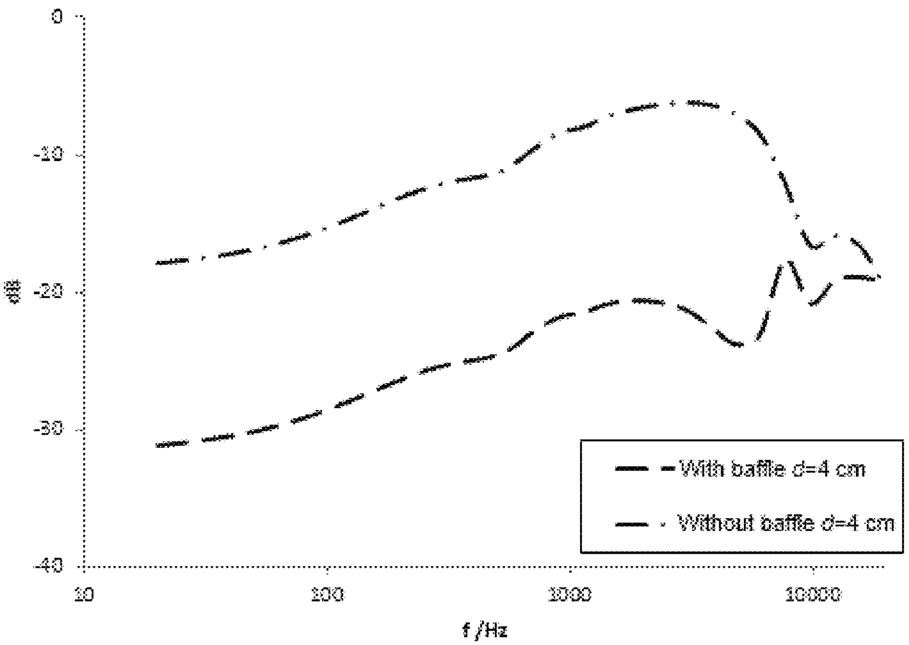
FIG. 25 is a schematic diagram illustrating exemplary frequency response characteristic curves in a far field when a distance d between two-point sound sources is 4 cm according to some embodiments of the present disclosure.

FIG. 21 is a schematic diagram illustrating exemplary frequency response characteristic curves in a near field when a distance d between two-point sound sources is 1 cm according to some embodiments of the present disclosure. FIG. 22 is a schematic diagram illustrating exemplary frequency response characteristic curves in a near field when a distance d between two-point sound sources is 2 cm according to some embodiments of the present disclosure. FIG. 23 is a schematic diagram illustrating exemplary frequency response characteristic curves in a near field when a distance d between two-point sound sources is 4 cm according to some embodiments of the present disclosure. FIG. 24 is a schematic diagram illustrating exemplary frequency response characteristic curves in a far field when a distance d between two-point sound sources is 2 cm according to some embodiments of the present disclosure. FIG. 25 is a schematic diagram illustrating exemplary frequency response characteristic curves in a far field when a distance d between two-point sound sources is 4 cm according to some embodiments of the present disclosure. As shown in FIGS. 21-23, for different distances d (e.g., 1 cm, 2 cm, 4 cm) between two-point sound sources, at a certain frequency, in a listening position in the near field (e.g., an ear of a user), a volume of a sound generated by two-point sound sources which are disposed on two sides of a baffle may be greater than a volume of a sound generated by two-point sound sources which are not disposed on two sides of the baffle. The certain frequency may be below 10000 Hz, or preferably, below 5000 Hz, or more preferably, below 1000 Hz.

As shown in FIGS. 24 and 25, for different distances d (e.g., 2 cm, 4 cm, etc.) between two-point sound sources, at a certain frequency, in far field (e.g., a position away from an ear of a user), a volume of a leaked sound generated by the two-point sound sources which are disposed on two sides of a baffle may be smaller than that generated by the two-point sound sources which are not disposed on two sides of the baffle. It should be noted that as the distance between the two-point sound sources increases, the interference cancellation of a sound at a position in the far field may be weakened, the sound leakage in the far field may be increased, and the ability of reducing the sound leakage may be reduced. The distance d between the two-point sound sources may be not greater than a distance threshold. In some embodiments, the distance d between the two-point sound sources may be set to be less than 20 cm to increase the volume in the near field and reduce the sound leakage in the far field. In some embodiments, the distance d between the two-point sound sources may be set to be less than 12 cm. In some embodiments, the distance d between the two-point sound sources may be set to be less than 10 cm. In some embodiments, the distance d between the two-point sound sources may be set to be less than 8 cm. In some embodiments, the distance d between the two-point sound sources may be set to be less than 6 cm. In some embodiments, the distance d between the two-point sound sources may be set to be less than 3 cm. For illustration purposes, taking the acoustic output device illustrated in FIG. 7A and/or FIG. 8A as an example, as shown in FIG. 7A and/or FIG. 8A, a plurality of sound guiding holes 30 may be arranged on the sidewall of the acoustic output device. Each of the plurality of sound guiding holes 30 may be regarded as one point sound source. The bottom of the acoustic output device spreading the leaked sound wave may be regarded as another point sound source. The distance d between the two-point sound sources used herein may refer to a straight line distance between the sound guiding hole 30 and a point (e.g., a point that may be acoustically equivalent to the bottom, such as a center point) on the bottom of the acoustic output device.

In some embodiments, when a distance between one point sound source and the baffle is much smaller than a distance between the other point sound source and the baffle, a sound volume of the acoustic output device at the listening position in the near field may be relatively large. Preferably, a ratio of the distance between one point sound source and the baffle to the distance between the other point sound source and the baffle may be less than or equal to ⅔. Preferably, the ratio may be less than or equal to ½. Preferably, the ratio may be less than or equal to ⅓. Preferably, the ratio may be less than or equal to ¼. Preferably, the ratio may be less than or equal to ⅙. Preferably, the ratio may be less than or equal to ⅒. For illustration purposes, still taking the acoustic output device illustrated in FIG. 7A and/or FIG. 8A as an example, as shown in FIG. 7A and/or FIG. 8A, a plurality of sound guiding holes 30 may be arranged on the sidewall of the acoustic output device. Each of the plurality of sound guiding holes 30 may be regarded as one point sound source. The bottom of the acoustic output device spreading the leaked sound wave may be regarded as another point sound source. Part of the housing between the two-point sound sources (e.g., a corner between a sound guiding hole and the bottom of the acoustic output device) may be regarded as a baffle, which may increase a sound path from one of the two-point sound sources to a user's ear. Specifically, the bottom of the acoustic output device may be equivalent to a point (e.g., a center point) on the bottom. The effect of the corner between a sound guiding hole and the bottom of the acoustic output device may be equivalent to that of a baffle inserted between the sound guiding hole and the bottom of the acoustic output device. Optionally or additionally, the baffle may be perpendicular to a line connecting the sound guiding holes 30 and the point on the bottom. In such cases, the distance between one point sound source and the baffle used herein may refer to a vertical distance from the sound guiding hole 30 to the baffle. And the distance between the other point sound source and the baffle used herein may refer to a vertical distance from the point on the bottom to the baffle.

Figure 26A:
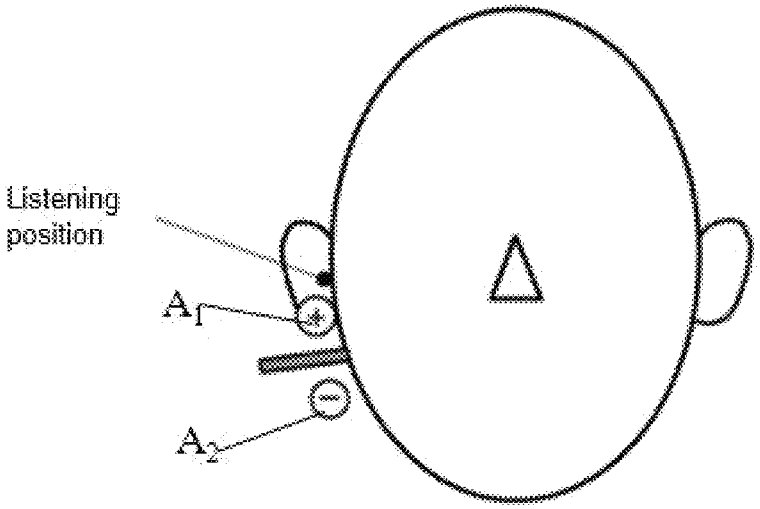
FIG. 26A is a schematic diagram illustrating an exemplary vertical arrangement of two-point sound sources located below a listening position according to some embodiments of the present disclosure.
Figure 26B:
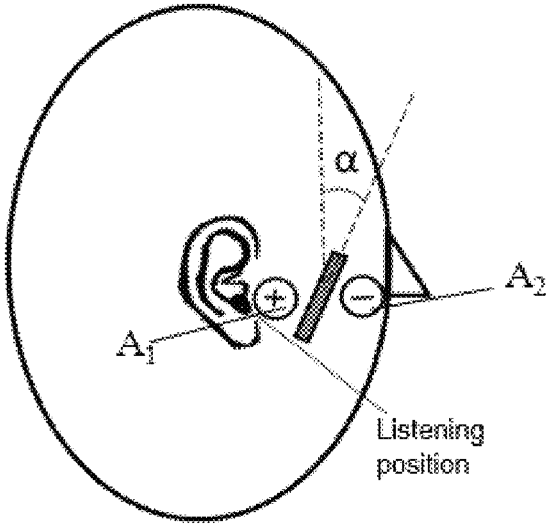
FIG. 26B is a schematic diagram illustrating an exemplary horizontal arrangement of two-point sound sources located in front of a listening position according to some embodiments of the present disclosure.

In some embodiments, for a certain distance between the two-point sound sources, a relative position of the listening position and/or a position of the baffle to the two-point sound sources may affect the volume of the sound in the near field and the sound leakage in the far field. In some embodiments, the two-point sound sources may be located on the same side of the listening position. For example, as shown in FIG. 26A, the two-point sound sources may (e.g., the point sound source A1 and the point sound source A2) may be located below the listening position (e.g., the user's ear). As another example, as shown in FIG. 26B, the two-point sound sources may be located in front of the listening position. It should be noted that the two-point sound sources are not limited to be located below or in front of the listening position, and may also be located above the listening position. For example, when a user wears the acoustic output device, the one or more sound guiding holes and the portion of the housing (e.g., the bottom 12, or other sides of the housing 10) from which the leaked sound wave is spread outside the housing may be located above the listening position. In such cases, each of the one or more sound guiding holes and the portion of the housing may form two-point sound sources located above the listening position. As another example, when a user wears the acoustic output device, the portion of the housing from which the leaked sound wave is spread outside the housing may be located near the listening position, wherein one part of the portion of the housing may be located above the listening position, another part of the portion of the housing may be located below the listening position, at least one of the one or more sound guiding holes may be located above the listening position, and at least one of the one or more sound guiding holes may be located below the listening position. In such cases, two-point sound sources located above the listening position and two-point sound sources located below the listening position may be obtained. In some embodiments, the two-point sound sources are not limited to the vertical arrangement shown in FIG. 26A and the horizontal arrangement shown in FIG. 26B. The two-point sound sources may also be arranged obliquely. In addition, the listening position may be located on a line connecting the two-point sound sources or not on the line connecting the two-point sound sources. For example, the listening position may be located on the upper, lower, left or right side of the line connecting the two-point sound sources.

In some embodiments, when the two-point sound sources are located on one side of the listening position and the distance between the two-point sound sources is constant, a point sound source closer to the listening position may generate sounds with a higher amplitude than the sounds generated by the other point sound source located on the other side of the baffle. There is less interference and cancellation between the two kinds of sound. In such cases, a heard sound with large volume may be generated at the listening position. In some embodiments, a distance between the point sound source close to the listening position and the listening position may be referred to as first distance. And a distance between the two-point sound sources may be referred to as second distance. A ratio of the first distance to the second distance may be not greater than 3. Preferably, the ratio of the first distance to the second distance may be not greater than 1. More preferably, the ratio of the first distance to the second distance may be not greater than 0.9. More preferably, the ratio of the first distance to the second distance may be not greater than 0.6. More preferably, the ratio of the first distance to the second distance may be not greater than 0.3.

In some embodiments, positions of the two-point sound sources may be designed such that when a user wears the acoustic output device, a ratio of a distance between one point sound source (e.g., the leftmost sound guiding hole 30 located on the sidewall 11 when the acoustic output device is worn by a user whose ear is on the left side of the housing 10 shown in FIG. 8) close to a listening position (e.g., an entrance position of the user's ear) and the baffle to the distance between the two-point sound sources is less than or equal to 0.5. Preferably, the ratio may be less than or equal to 0.3.

In some embodiments, when the two-point sound sources are located on one side of the listening position and the distance between the two-point sound sources is constant, a height of the baffle may affect the volume of the sound in the near field and the sound leakage in the far field. As described in connection with various embodiments of the present disclosure, the height of the baffle refers to a height of the part of the housing located between the at least one sound guiding hole (e.g., the sound guiding hole 30) and the portion of the housing (e.g., the bottom of the acoustic output device). Merely by way of example, as described above, the corner between a sound guiding hole and the bottom of the acoustic output device may be regarded as a baffle perpendicular to a line connecting the two-point sound sources (i.e., the sound guiding holes 30 and the point on the bottom). In such cases, the height of the baffle used herein may refer to a length of the baffle along a direction perpendicular to the line connecting the two-point sound sources. In some embodiments, the height of the baffle may be not greater than the distance between the two sound guide holes. Preferably, the ratio of the height of the baffle to the distance between the two-point sound sources may be not greater than 5. Preferably, a ratio of the height of baffle to the distance d between the two-point sound sources may be less than or equal to 3. More preferably, the ratio may be less than or equal to 2. More preferably, the ratio may be less than or equal to 1.8. More preferably, the ratio may be less than or equal to 1.5. More preferably, the ratio may be less than or equal to 1.

Figure 27:
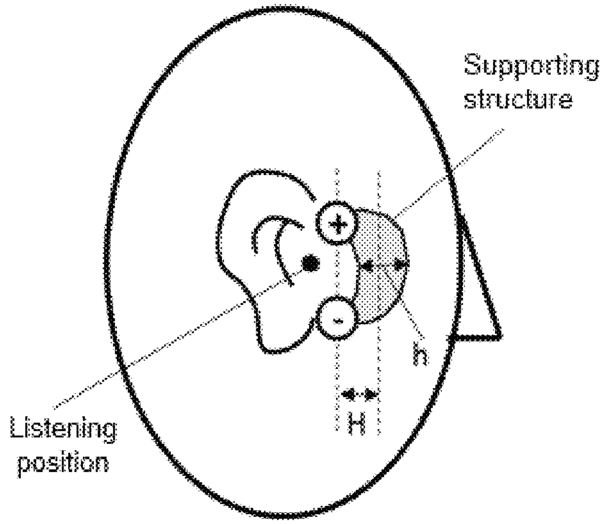
FIG. 27 is a schematic structure of an acoustic output device according to some embodiments of the present disclosure.

In some embodiments, as described above, the at least one sound guiding hole and the portion (e.g., the bottom) of the housing spreading the leaked sound wave may be regarded as two-point sound sources. Part of the housing between the two point sound sources (e.g., a corner between a sound guiding hole and the bottom of the acoustic output device) may be regarded as a baffle. In some alternative embodiments, the housing of the acoustic output device may be regarded as a supporting structure of the two-point sound sources. For example, as shown in FIG. 27, two-point sound sources (represented by "+" and "−" respectively) may be located at both ends of a supporting structure. In such cases, the whole housing of the acoustic output device may be regarded as a baffle. In some embodiments, a distance between a center (i.e., a centroid) of the supporting structure and the two-point sound sources may affect a volume of a sound at the listening position in a near field and/or a volume of sound leakage in a far field. For example, as shown in FIG. 27, a distance between a center of the supporting structure and a line connecting the two-point sound sources is H, and a height of the supporting structure in a direction perpendicular to the line connecting the two-point sound sources is h (i.e., a height of the baffle). In some embodiments, a ratio of the distance H between the center of the supporting structure and the line connecting the two-point sound sources to the height h of the supporting structure in the direction perpendicular to the line connecting the two-point sound sources may be less than or equal to 2. Preferably, the ratio of the distance H to the height h may be less than or equal to 2. More preferably, the ratio of the distance H to the height h may be less than or equal to 1.5. More preferably, the ratio of the distance H to the height h may be less than or equal to 1. More preferably, the ratio of the distance H to the height h may be less than or equal to 0.5. More preferably, the ratio of the distance H to the height h may be less than or equal to 0.3.

In some embodiments, when the two-point sound sources generate sounds with opposite phases, amplitudes of the sounds may be adjusted to improve the output performance of the acoustic output device. Specifically, the amplitude of the sound transmitted by each of the two-point sound sources may be adjusted by adjusting an impedance of an acoustic route between the point sound source and a transducer. In some embodiments, the impedance may refer to a resistance that an acoustic wave overcomes when the acoustic wave is transmitted in a medium. In some embodiments, the acoustic route may be or may not be filled with damping material (e.g., a tuning net, tuning cotton, etc.) to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a size of a hole or a surface that is equivalent to a point sound source may be adjusted to change the acoustic resistance of the acoustic route. In some embodiments, a ratio of acoustic impedance between the transducer (e.g., the vibration diaphragm of the transducer) and the two-point sound sources may be in a range of 0.5-2. In some embodiments, the ratio of the acoustic impedance between the transducer and the two-point sound sources may be in a range of 0.8-1.2.

Embodiment Three

Figure 7B:
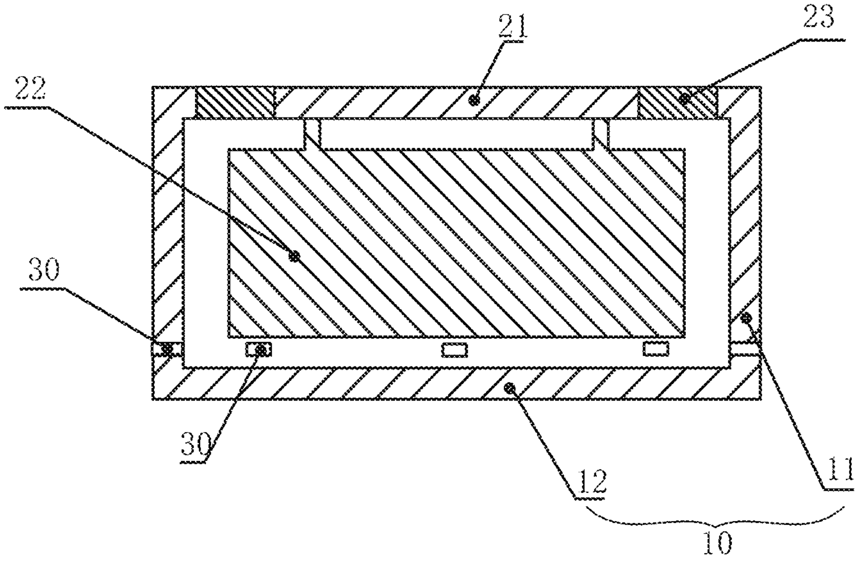

FIGS. 7A and 7B are schematic structures illustrating an exemplary bone conduction speaker according to some embodiments of the present disclosure. The bone conduction speaker may include an open housing 10, a vibration board 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer may include components such as magnetizer, voice coil, and etc., and the components may located inside the housing and may generate synchronous vibrations with a same frequency.

Figure 7C:
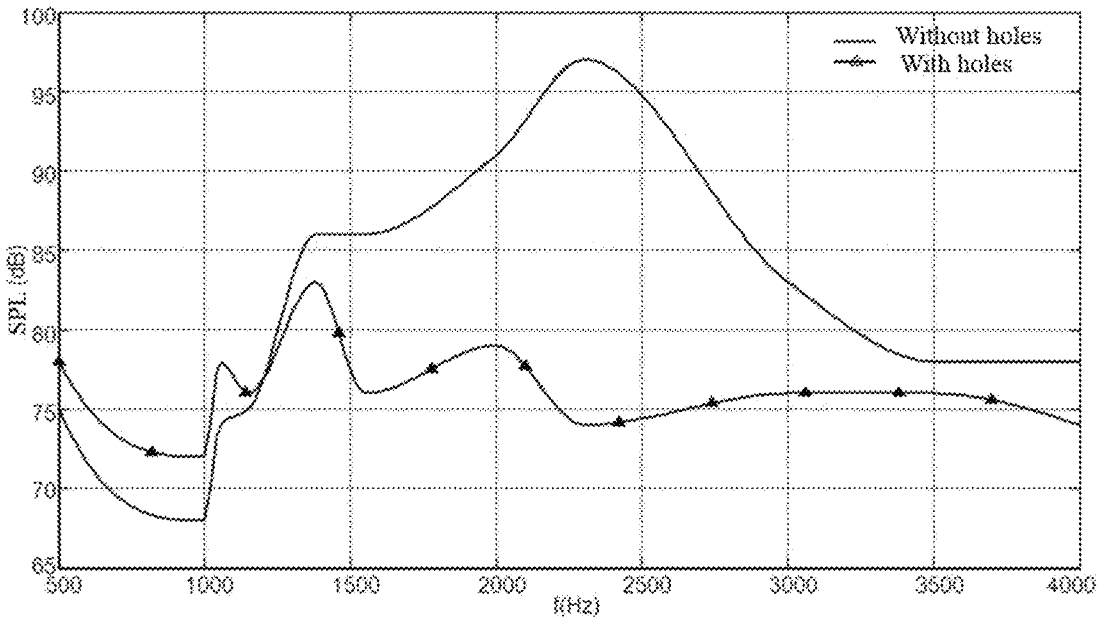
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz~4000 Hz, the sound leakage is reduced by more than 5 dB, and in the frequency range of 2250 Hz~2500 Hz, the sound leakage is reduced by more than 20 dB.

Embodiment Four

Figure 8A:
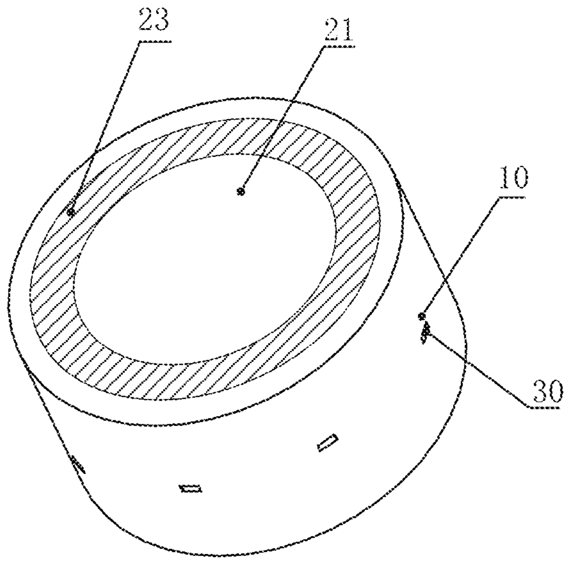
FIGS. 8A and 8B are schematic structure of an exemplary bone conduction speaker according to some embodiments of the present disclosure.
Figure 8B:
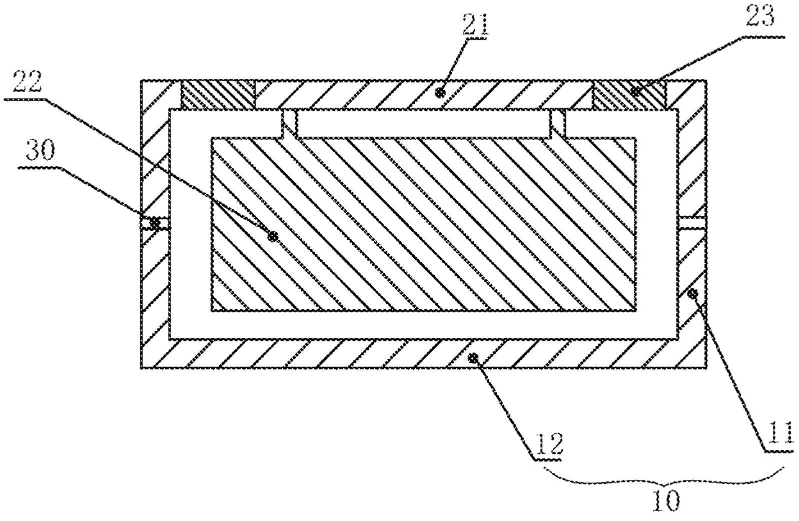

FIGS. 8A and 8B are schematic structures illustrating an exemplary bone conduction speaker according to some embodiments of the present disclosure. The bone conduction speaker may include an open housing 10, a vibration board 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
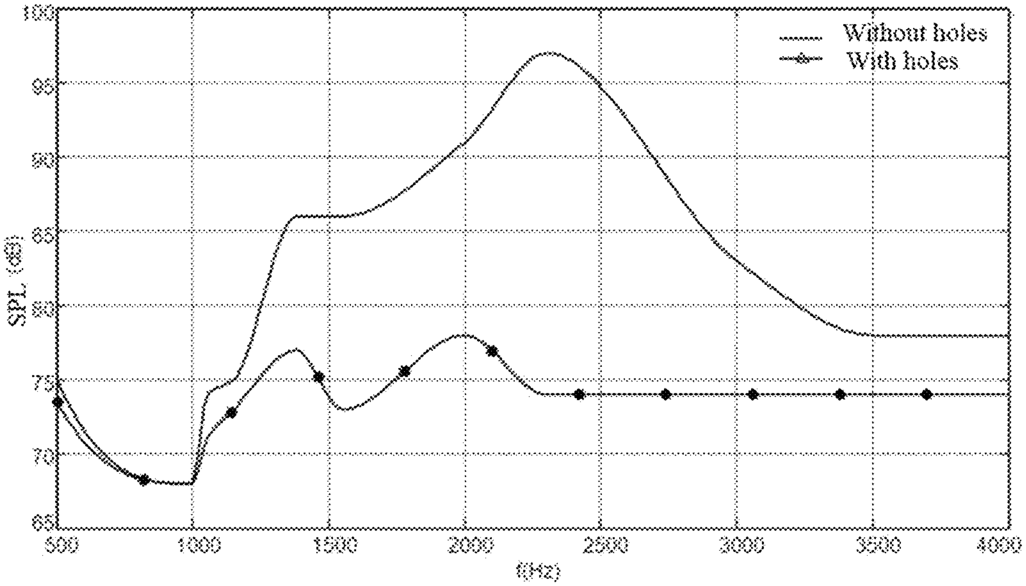
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
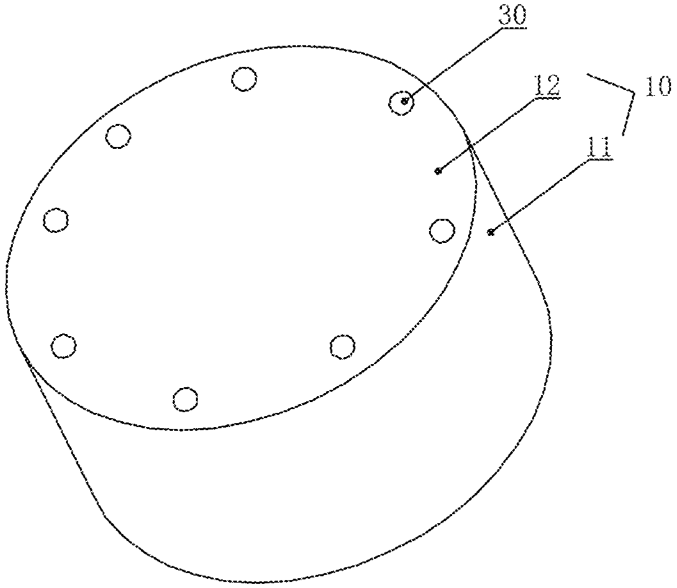
FIGS. 9A and 9B are schematic structures of an exemplary bone conduction speaker according to some embodiments of the present disclosure.
Figure 9B:
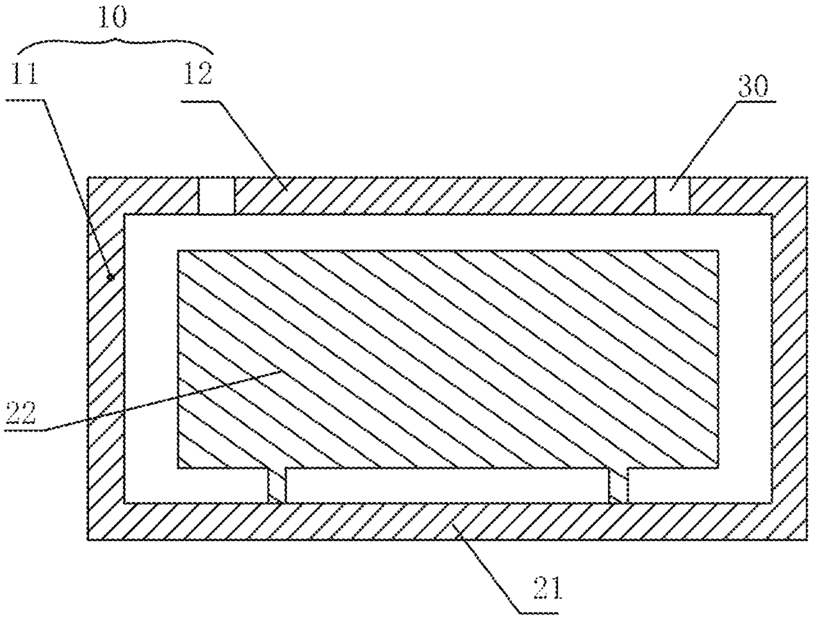

FIGS. 9A and 9B are schematic structures of an exemplary bone conduction speaker according to some embodiments of the present disclosure. The bone conduction speaker may include an open housing 10, a vibration board 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly of unevenly in one or more circles on the bottom of the housing 10. In some embodiments, the shape of one or more of the sound guiding holes 30 may be rectangle.

As shown in FIG. 9A and FIG. 9B, the one or more sound guiding holes 30 may be arranged symmetrically and/or evenly in a circle on the bottom 12 of the housing 10. The one or more sound guiding holes 30 may have a same or approximately same distance to a center point (a point that may be acoustically equivalent to the bottom 12) of the bottom 12. In some embodiments, a difference between the distances from any two sound guiding holes 30 to the center point of the bottom 12 may be less than 5 mm. In some embodiments, the difference between the distances from any two sound guiding holes 30 to the center point of the bottom 12 may be less than 3 mm. In some embodiments, a difference between the distances from any two sound guiding holes 30 to the center point of the bottom 12 may be less than 1 mm. In some embodiments, the difference between the distances from any two sound guiding holes 30 to the center point of the bottom 12 may be less than 0.5 mm.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
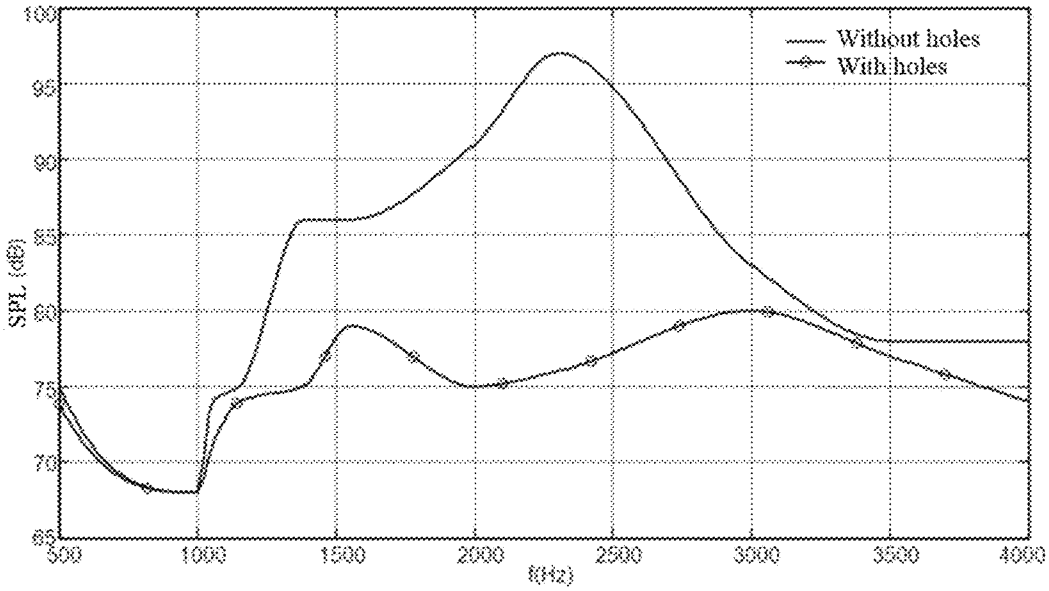
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz~3000 Hz, the effectiveness of reducing sound leakage is outstanding. For example, in the frequency range of 1700 Hz~2700 Hz, the sound leakage is reduced by more than 10 dB; in the frequency range of 2200 Hz~2400 Hz, the sound leakage is reduced by more than 20 dB.

Embodiment Six

Figure 10A:
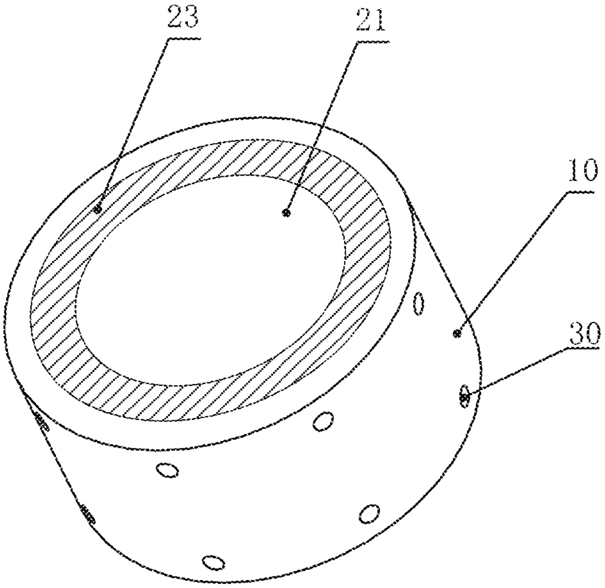
FIGS. 10A and 10B are schematic structures of an exemplary bone conduction speaker according to some embodiments of the present disclosure.
Figure 10B:
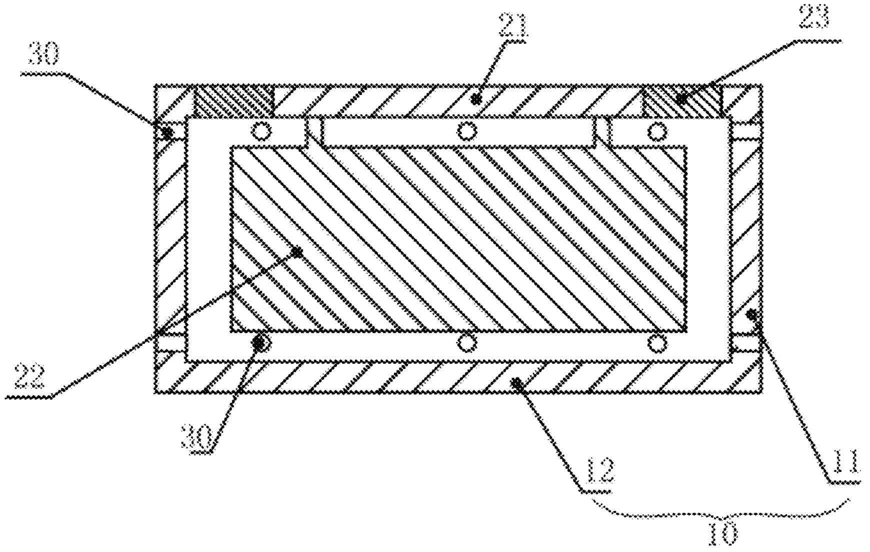

FIGS. 10A and 10B are schematic structures of an exemplary bone conduction speaker according to some embodiments of the present disclosure. The bone conduction speaker may include an open housing 10, a vibration board 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
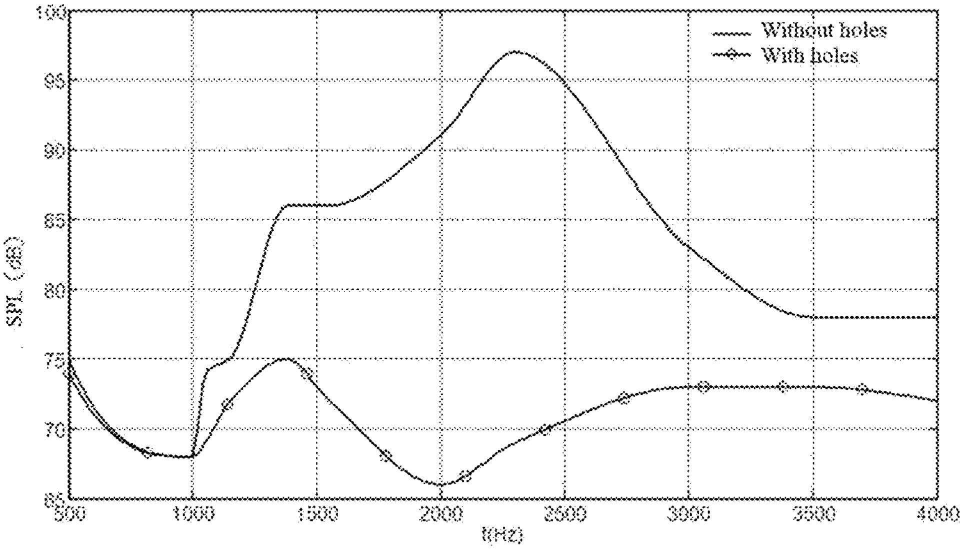
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

Embodiment Seven

Figure 11A:
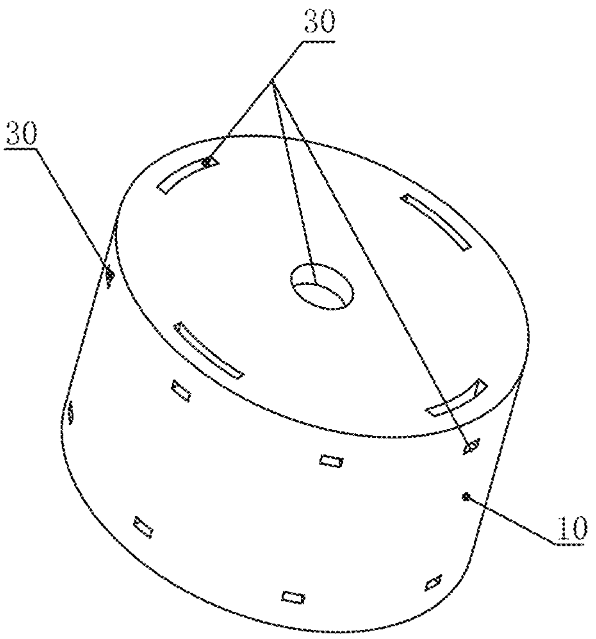
FIGS. 11A and 11B are schematic structures of an exemplary bone conduction speaker according to some embodiments of the present disclosure.
Figure 11B:
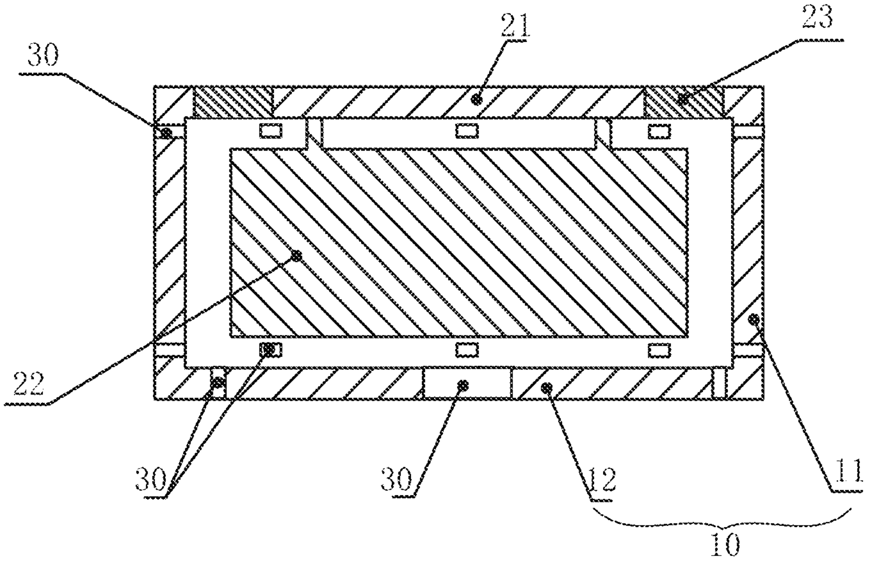

FIGS. 11A and 11B are schematic structures illustrating a bone conduction speaker according to some embodiments of the present disclosure. The bone conduction speaker may include an open housing 10, a vibration board 21 and a transducer 22. One or more perforative sound guiding holes 30 may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

In some embodiments, the bottom 12 from which the leaked sound wave is spread outside the housing 10 may be regarded as one sound source, and each of the sound guiding hole(s) 30 may be regarded as another point sound source. In such cases, the leaked sound wave spread outside the housing 10 from the bottom 12 may be interfered by the guided sound wave passing through the sound guiding hole(s) 30 such that the sound leakage in the target region may be reduced. In some embodiments, as illustrated in FIGS. 11A and 11B, the sound guiding holes 30 on the sidewall may have a same or approximately same distance to the bottom 12 of the housing 10. That is, the sound guiding holes 30 through which the sound wave inside the housing 10 is guided to an outside of the housing 10 may have a same or approximately same distance to the portion of the housing 10 from which the leaked sound wave is spread outside the housing 10.

In some embodiments, as mentioned above, the equivalence of the two-point sound sources in a bone conduction speaker is also applicable for an air conduction speaker. Merely by way of example, in an air conduction speaker, a portion of the housing from which the leaked sound wave is spread outside the housing includes a sound guiding hole that guides sound waves inside a cavity of the housing to the outside of the housing, thus forming the sound leakage. For example, one sound guiding hole (e.g., a circular perforative hole on the center of the bottom of the housing) may be regarded as one sound source, and another sound guiding hole (e.g., the sound guiding holes on the sidewall of the housing) may be regarded as another sound source. In such cases, the leaked sound wave spread outside the housing from the sound guiding hole(s) on the bottom of the housing may be interfered by the guided sound wave passing through the sound guiding hole(s) on the sidewall such that the sound leakage in the target region may be reduced. In some embodiments, two or more sound guiding holes on the sidewall of the housing may have a same or approximately same distance to the sound guiding hole(s) on the bottom of the housing. The sound guiding holes through which the sound wave inside the housing is guided to an outside of the housing may have a same or approximately same distance to the sound guiding holes through which the leaked sound wave is spread outside the housing.

Figure 11C:
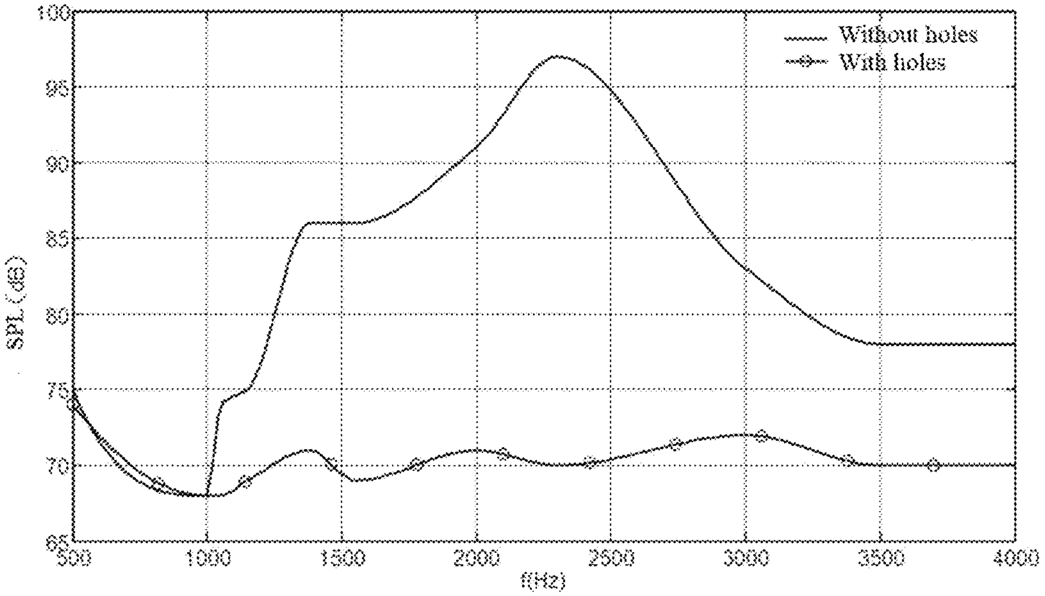
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1700 Hz and 2500 Hz~4000 Hz, this scheme has a better effect of reduced sound leakage than embodiment six.

Embodiment Eight

Figure 12A:
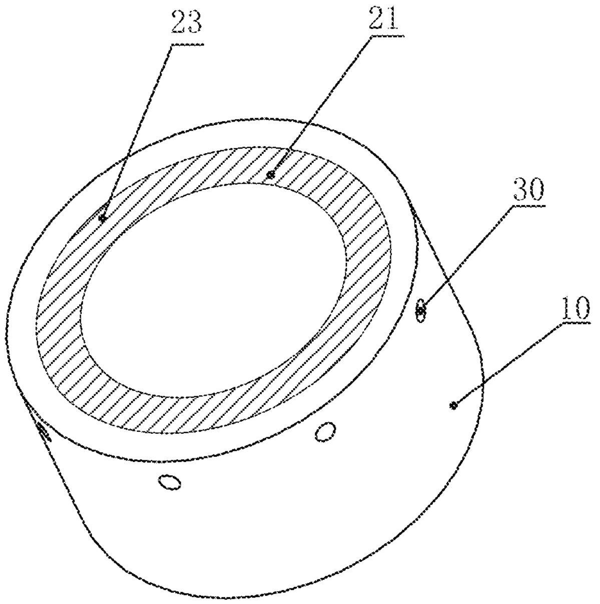
FIGS. 12A and 12B are schematic structures of an exemplary bone conduction speaker according to some embodiments of the present disclosure.
Figure 12B:
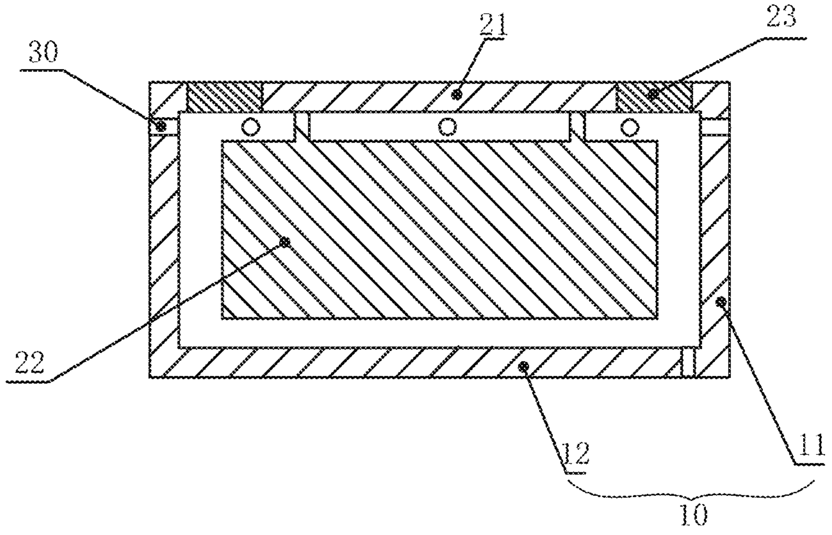

FIGS. 12A and 12B are schematic structures illustrating a bone conduction speaker according to some embodiments of the present disclosure. The bone conduction speaker may include an open housing 10, a vibration board 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
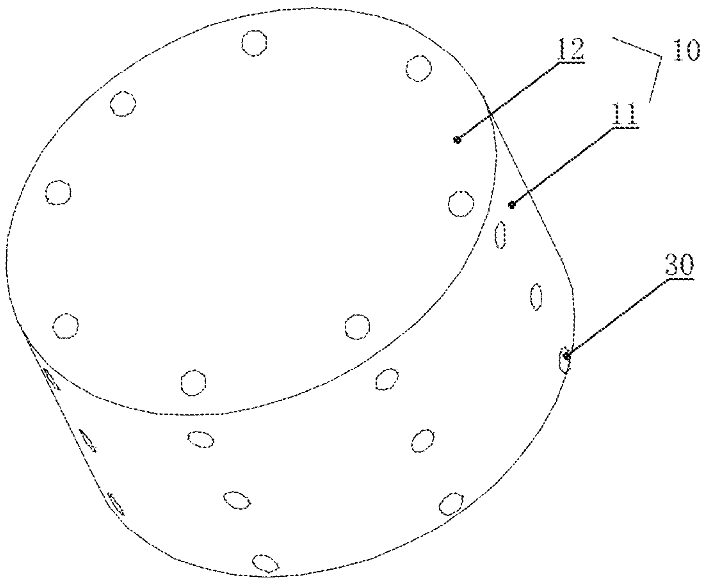
FIGS. 13A and 13B are schematic structures of an exemplary bone conduction speaker according to some embodiments of the present disclosure.
Figure 13B:
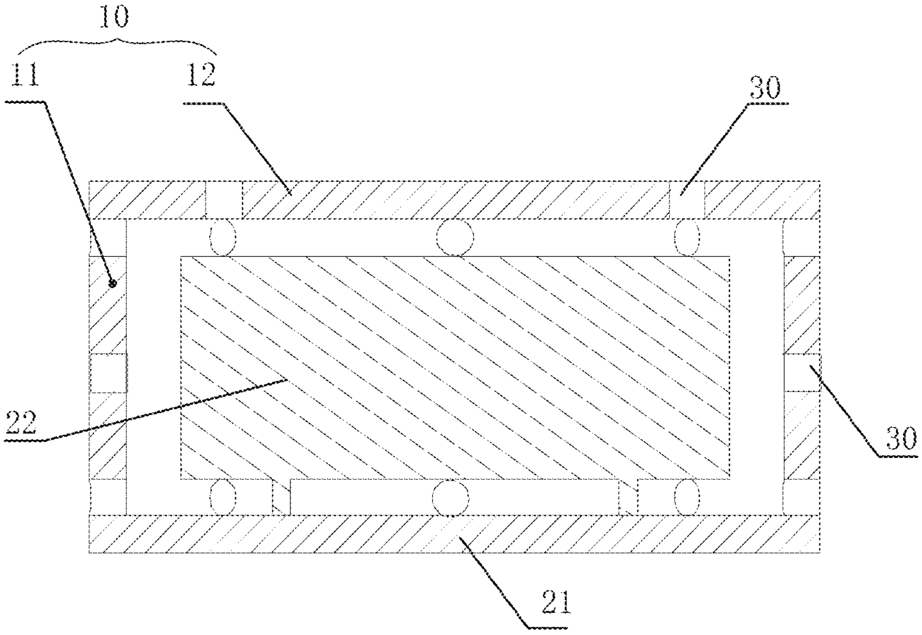

FIGS. 13A and 13B are schematic structures illustrating a bone conduction speaker according to some embodiments of the present disclosure. The bone conduction speaker may include an open housing 10, a vibration board 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e. leaked sound waves with specific wavelengths).

In some embodiments, different portions of a same sound guiding hole can be configured to generate a same phase to reduce leaked sound waves on the same wavelength (e.g. using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. A method, comprising:

providing a speaker including:

a housing;

a transducer residing inside the housing and configured to generate vibrations, the vibrations producing a sound wave inside a cavity of the housing and causing a leaked sound wave spreading outside the housing at least from a portion of the housing; and at least two sound guiding holes located on the housing and configured to guide the sound wave inside the cavity of the housing through the at least two sound guiding holes to an outside of the housing, the guided sound wave having a phase different from a phase of the leaked sound wave, the guided sound wave interfering with the leaked sound wave in a target region, and the interference reducing a sound pressure level of the leaked sound wave in the target region, wherein a difference between distances from the at least two sound guiding holes to the portion of the housing from which the leaked sound wave is spread outside the housing is less than 5 mm.

2. The method of claim 1, wherein the difference between the distances from the at least two sound guiding holes to the portion of the housing from which the leaked sound wave is spread outside the housing is less than 1 mm.

3. The method of claim 1, wherein when a user wears the speaker, the at least two sound guiding holes and the portion of the housing are located above a listening position of the user.

4. The method of claim 1, wherein when a user wears the speaker, the portion of the housing is located near a listening position of the user, at least one of the at least two sound guiding holes is located above the listening position of the user, and at least one of the at least two sound guiding holes is located below the listening position of the user.

5. The method of claim 1, wherein:

the housing includes a bottom or a sidewall; and the at least two sound guiding holes are located on the bottom or the sidewall of the housing.

6. The method of claim 1, wherein the at least two sound guiding holes are arranged on a wall of the housing different from a wall on which the portion of the housing is located.

7. The method of claim 1, wherein a location of at least one sound guiding hole of the at least two sound guiding holes is determined based on at least one of: a vibration frequency of the transducer, a shape of the at least one sound guiding hole, the target region, or a frequency range within which the sound pressure level of the leaked sound wave is to be reduced.

8. The method of claim 1, wherein at least one of the at least two sound guiding holes includes a damping layer, the damping layer being configured to adjust the phase of the guided sound wave in the target region.

9. The method of claim 1, wherein the at least two sound guiding holes are configured to guide at least two guided sound waves having a same phase to the target region, the at least two sound waves being configured to reduce the sound pressure level of the leaked sound wave having a same wavelength.

10. The method of claim 1, wherein the at least two sound guiding holes are configured to guide at least two guided sound waves having different phases to the target region, the at least two sound waves being configured to reduce the sound pressure level of the leaked sound wave having different wavelengths.

11. A speaker, comprising:

a housing;

a transducer residing inside the housing and configured to generate vibrations, the vibrations producing a sound wave inside a cavity of the housing and causing a leaked sound wave spreading outside the housing at least from a portion of the housing; and at least two sound guiding holes located on the housing and configured to guide the sound wave inside the cavity of the housing through the at least two sound guiding holes to an outside of the housing, the guided sound wave having a phase different from a phase of the leaked sound wave, the guided sound wave interfering with the leaked sound wave in a target region, and the interference reducing a sound pressure level of the leaked sound wave in the target region, wherein a difference between distances from the at least two sound guiding holes to the portion of the housing from which the leaked sound wave is spread outside the housing is less than 5 mm.

12. The speaker of claim 11, wherein the difference between the distances from the at least two sound guiding holes to the portion of the housing from which the leaked sound wave is spread outside the housing is less than 1 mm.

13. The speaker of claim 11, wherein when a user wears the speaker, the at least two sound guiding holes and the portion of the housing are located above a listening position of the user.

14. The speaker of claim 11, wherein when a user wears the speaker, the portion of the housing is located near a listening position of the user, at least one of the at least two sound guiding holes is located above the listening position of the user, and at least one of the at least two sound guiding holes is located below the listening position of the user.

15. The speaker of claim 11, wherein:

the housing includes a bottom or a sidewall; and the at least two sound guiding holes are located on the bottom or the sidewall of the housing.

16. The speaker of claim 11, wherein the at least two sound guiding holes are arranged on a wall of the housing different from a wall on which the portion of the housing is located.

17. The speaker of claim 11, wherein at least one of the at least two sound guiding holes includes a damping layer, the damping layer being configured to adjust the phase of the guided sound wave in the target region.

18. The speaker of claim 11, wherein a location of at least one sound guiding hole of the at least two sound guiding holes is determined based on at least one of: a vibration frequency of the transducer, a shape of the at least one sound guiding hole, the target region, or a frequency range within which the sound pressure level of the leaked sound wave is to be reduced.

19. The speaker of claim 11, wherein at least one of the at least two sound guiding holes includes a damping layer, the damping layer being configured to adjust the phase of the guided sound wave in the target region.

20. The speaker of claim 11, wherein the at least two sound guiding holes are configured to guide at least two guided sound waves having a same phase to the target region, the at least two sound waves being configured to reduce the sound pressure level of the leaked sound wave having a same wavelength.

* * * * *